United States Patent
Lee et al.

(10) Patent No.: US 8,929,472 B1
(45) Date of Patent: Jan. 6, 2015

(54) BIT-LEVEL COMBINING FOR MIMO SYSTEMS WITH HARQ AND/OR REPETITION CODING

(75) Inventors: Jungwon Lee, Cupertino, CA (US); Woong Jun Jang, Stanford, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 1131 days.

(21) Appl. No.: 11/782,556

(22) Filed: Jul. 24, 2007

Related U.S. Application Data

(60) Provisional application No. 60/820,414, filed on Jul. 26, 2006, provisional application No. 60/822,291, filed on Aug. 14, 2006.

(51) Int. Cl.
*H04B 7/02* (2006.01)
*H04L 1/02* (2006.01)

(52) U.S. Cl.
USPC ........................................................ 375/267

(58) Field of Classification Search
USPC ........................................................ 375/267
See application file for complete search history.

(56) References Cited

U.S. PATENT DOCUMENTS

| | | | |
|---|---|---|---|
| 6,185,258 B1 | 2/2001 | Alamouti | |
| 6,567,388 B1 | 5/2003 | Tomcik et al. | |
| 6,687,492 B1 | 2/2004 | Sugar et al. | |
| 6,778,619 B2 | 8/2004 | Zangi et al. | |
| 6,868,520 B1 * | 3/2005 | Fauconnier | 714/790 |
| 6,892,341 B2 | 5/2005 | Golitschek et al. | |
| 6,967,598 B2 | 11/2005 | Mills | |
| 7,031,419 B2 | 4/2006 | Piirainen | |
| 7,194,237 B2 | 3/2007 | Sugar et al. | |
| 7,295,624 B2 | 11/2007 | Onggosanusi et al. | |
| 7,308,026 B2 | 12/2007 | Purho | |
| 7,308,047 B2 | 12/2007 | Sadowsky | |
| 7,362,815 B2 | 4/2008 | Lindskog et al. | |
| 7,366,247 B2 | 4/2008 | Kim et al. | |
| 7,382,841 B2 | 6/2008 | Ohtaki et al. | |
| 7,386,079 B2 | 6/2008 | Skog et al. | |
| 7,428,269 B2 | 9/2008 | Sampath | |
| 7,489,746 B1 | 2/2009 | Awater et al. | |
| 7,502,432 B2 | 3/2009 | Catreux et al. | |

(Continued)

FOREIGN PATENT DOCUMENTS

| | | |
|---|---|---|
| EP | 1271835 | 1/2003 |
| EP | 1501210 | 1/2005 |

(Continued)

OTHER PUBLICATIONS

Harvind Samara, Zhi Ding, New MIMO ARQ Protocols and Joint Detection via Sphere Decoding, IEEE, Feb. 2006, 1-10.*

(Continued)

*Primary Examiner* — Tanmay Shah

(57) ABSTRACT

Systems and methods are provided for decoding signal vectors in multiple-input multiple-output (MIMO) systems, where the receiver has received one or more signal vectors from a common digital information sequence. Each received signal vector is decoded using, for example, a maximum-likelihood decoder to produce log-likelihood ratios. The results of the decoders are combined by addition to produce a final decoding estimate. In some embodiments, each of the received signals may be processed prior to decoding. The disclosed decoding scheme may utilize all received information without increasing hardware complexity.

72 Claims, 21 Drawing Sheets

(56) References Cited

U.S. PATENT DOCUMENTS

| | | | |
|---|---|---|---|
| 7,526,038 B2 | 4/2009 | McNamara | |
| 7,539,274 B2 | 5/2009 | Catreux et al. | |
| 7,548,592 B2 | 6/2009 | Wight | |
| 7,554,985 B2 | 6/2009 | Ihm et al. | |
| 7,567,583 B2 | 7/2009 | Miyoshi | |
| 7,573,806 B2 | 8/2009 | Ihm et al. | |
| 7,590,204 B2 | 9/2009 | Monsen | |
| 7,593,489 B2 | 9/2009 | Koshy et al. | |
| 7,649,953 B2 | 1/2010 | Bauch | |
| 7,693,551 B2 | 4/2010 | Ojard | |
| 7,729,411 B2 | 6/2010 | Wang et al. | |
| 7,742,550 B2 | 6/2010 | Olesen et al. | |
| 7,751,506 B2 | 7/2010 | Niu et al. | |
| 7,782,971 B2 | 8/2010 | Burg et al. | |
| 7,885,364 B2 | 2/2011 | Ito | |
| 2003/0185295 A1 | 10/2003 | Yousef | |
| 2004/0181419 A1 | 9/2004 | Davis et al. | |
| 2005/0091568 A1* | 4/2005 | Levy et al. | 714/755 |
| 2006/0107167 A1 | 5/2006 | Jeong et al. | |
| 2006/0251156 A1 | 11/2006 | Grant et al. | |
| 2006/0274836 A1 | 12/2006 | Sampath et al. | |
| 2007/0155433 A1 | 7/2007 | Ito et al. | |
| 2007/0206531 A1* | 9/2007 | Pajukoski et al. | 370/329 |
| 2007/0254662 A1* | 11/2007 | Khan et al. | 455/436 |
| 2007/0268988 A1* | 11/2007 | Hedayat et al. | 375/347 |
| 2007/0291882 A1 | 12/2007 | Park et al. | |
| 2008/0025427 A1 | 1/2008 | Lee et al. | |
| 2008/0025429 A1 | 1/2008 | Lee et al. | |
| 2008/0025443 A1 | 1/2008 | Lee et al. | |
| 2008/0037670 A1 | 2/2008 | Lee et al. | |
| 2008/0049865 A1 | 2/2008 | Blankenship et al. | |
| 2008/0063103 A1 | 3/2008 | Lee et al. | |
| 2008/0144733 A1 | 6/2008 | ElGamal et al. | |
| 2008/0159375 A1 | 7/2008 | Park et al. | |
| 2008/0198941 A1 | 8/2008 | Song et al. | |
| 2009/0031183 A1 | 1/2009 | Hoshino et al. | |
| 2009/0245476 A1 | 10/2009 | Lindqvist | |
| 2009/0252236 A1 | 10/2009 | Li et al. | |
| 2009/0257407 A1* | 10/2009 | Park et al. | 370/336 |
| 2009/0307558 A1 | 12/2009 | Lee et al. | |
| 2010/0014601 A1 | 1/2010 | Mo et al. | |

FOREIGN PATENT DOCUMENTS

| | | |
|---|---|---|
| EP | 1 608 081 | 12/2005 |
| WO | WO 00/52873 | 9/2000 |
| WO | WO 02/067491 | 8/2002 |

OTHER PUBLICATIONS

Riichiro Nagareda, Kazuhiko Fukawa, Hiroshi Suzuki, OFDM Mobile Packet Transmission System with Multiuser Detection and Metric Combining ARQ, IEEE 2004, 1-5.*
Chase, David. "Code Combining—A Maximum-Likelihood Decoding Approach for Combining an Arbitrary Number of Noisy Packets" *IEEE Transactions on Communications*, vol. Comm-33 No. 5, pp. 385-393 (May 1985).
802.16e: IEEE Standard for Local and metropolitan area networks Part 16: Air Interface for Fixed and Mobile Broadband Wireless Access Systems Amendment for Physical and Medium Access Control Layers for Combined Fixed and Mobile Operation in Licensed Bands, pp. 1-3, 485-495, 635, and 649-650 (Feb. 2006).
Onggosanusi, Eko N. et al. "Hybrid ARQ Transmission and Combining for MIMO systems" *IEEE*, 2003.
Krishnaswamy, Dilip, et al. "Multi-Level Weighted Combining of Retransmitted Vectors in Wireless Communications." *IEEE VTC.* Sep. 2006.
Acolatse, Kodzovi et al. "An Alamouti-based Hybrid-ARQ Scheme for MIMO Systems" 14th IST Mobile and Wireless Communications, Dresden (Jun. 2005).
Acolatse, Kodzovi et al. "Space Time Block Coding HARQ scheme for Highly Frequency Selective Channels" 2007 IEEE International Conference on Communications, pp. 4416-4420 (Jun. 24, 2007).

Alamouti, Siavash, M. "A Simple Transmit Diversity Technique for Wireless Communications." IEEE Journal on Select Areas in Communications, vol. 16, No. 8. (Oct. 1998).
Chiang, Ping-Hung et al. "Performance of 2IMO Differentially Transmit-Diversity Block Coded OFDM Systems in Doubly Selective Channels" Global Telecommunications Conference, 2005, pp. 3768-3773 (Nov. 11, 2005).
Kim, Woo Tai et al. Performance of STBC with Turbo Code in HARQ Scheme for Mobile Communication System. Telecommunications, 2003. ICT 2003. 10th International Conference, pp. 85-59 (Feb. 23, 2003).
Koike T., et al. "Hybrid ARQ scheme suitable for coded MIMO transmission" Communications, IEEE International Conference, Paris, France, pp. 2919-2923 (Jun. 20, 2004).
Nagareda R et al. "OFDM mobile packet transmission system with multiuser detection and metric combining ARQ" Vehicular Technology Conference, 2004 VTC2004-Fall. 2004 IEEE 60th Los Angeles, CA USA, pp. 709-713 (Sep. 26, 2004).
Samra H, Zhi Ding "New MIMO ARQ protocols and joint detection via sphere decoding" IEEE Transactions on Signal Processing [online] Feb. 28, 2006, pp. 473-482.
Samra Harvino, Ding Zhi "Sphere decoding for retransmission diversity in MIMO flat-fading channels" ICASSP IEEE Int. Conf. Acoust. Speech Signal Process [online], pp. 585-588 (May 17, 2004).
Schmitt M. P. "Improved retransmission strategy for hybrid ARQ schemes employing TCM" Wireless Communications and Networking Conference, 1999 IEEE New Orleans, LA, pp. 1226-1228 (Sep. 21, 1999).
Tirkkonen, O et al. "Square-Matrix Embeddable Space-Time Block Codes for Complex Signal Constellations," IEEE Trans. Info. Theory, vol. 48, pp. 384-395 (Feb. 2002).
Tong, Wen et al. Soft packet combing for STC re-transmission to improve H-ARQ performance in MIMO mode. Proposal for IEEE 802.16 Broadband Wireless Access Working Group, pp. 1-5 (Jul. 7, 2004).
Arkhipov, Alexander et al., "OFDMA-CDM Performance Enhancement by Combining H-ARQ and Interference Cancellation," IEEE Journal on Selected Areas in Communications, vol. 24, No. 6, pp. 1199-1207 (Jun. 2006).
Cioffi, J.M. et al., "Generalized decision-feedback equalization for packet transmission with ISI and gaussian noise," Communications, computation, control and signal processing: a tribute to Thomas Kailath, pp. 79-127 (1997).
Davis, Linda M., "Scaled and Decoupled Cholesky and QR Decompositions with Application to Spherical MIMO Detection," IEEE Wireless Communications and Networking, vol. 1, pp. 326-331 (2003).
Dekorsy, Armin, "A Cutoff Rate based Cross-Layer Metric for MIMO-HARQ Transmission," IEEE 16th International Symposium on Personal, Indoor and Mobile Radio Communications, vol. 4, pp. 2166-2170 (2005).
Gharavi-Alkhansari, Mohammad et al., "Constellation Space Invariance of Space-Time Block Codes with Application to Optimal Antenna Subset Selection," 4th IEEE Workshop on Signal Processing Advances in Wireless Communications, pp. 269-273 (2003).
Ginis, George et al., "On the Relation Between V-BLAST and the GDFE," IEEE Communications Letters, vol. 5, No. 9, pp. 364-366 (Sep. 2001).
Hassibi, Babak, "An Efficient Square-Root Algorithm for BLAST," IEEE International Conference on Acoustics, Speech, and Signal Processing, vol. 2, pp. 737-740 (2000).
Liu, Peng et al., "A New Efficient MIMO Detection Algorithm based on Cholesky Decomposition," The 6th International Conference on Advanced Communication Technology, vol. 1, pp. 264-268 (2004).
Nakajima, Akinori et al., "Iterative Joint PIC and 2D MMSE-FDE for Turbo-coded HARQ with SC-MIMO Multiplexing," IEEE 63rd Vehicular Technology Conference, vol. 5, pp. 2503-2507 (May 2006).
Nakajima, Akinori et al., "Throughput of Turbo Coded Hybrid ARQ Using Single-carrier MIMO Multiplexing," IEEE 61st Vehicular Technology Conference, vol. 1, pp. 610-614 (2005).

(56) References Cited

OTHER PUBLICATIONS

Oh, Mi-Kyung et al., "Efficient Hybrid ARQ with Space-Time Coding and Low-Complexity Decoding," IEEE Conference on Acoustics, Speech, and Signal Processing, vol. 4, pp. 589-592 (2004).

Rontogiannis, Athanasios A. et al., "An Adaptive Decision Feedback Equalizer for Time-Varying Frequency Selective Mimo Channels," IEEE 7th Workshop on Selective MIMO Channels Signal Processing Advances in Wireless Communications, pp. 1-5 (Jul. 2006).

Theofilakos, Panagiotis et al., "Frobenius Norm Based Receive Antenna Subarray Formation for MIMO Systems," First European Conference on Antennas and Propagation, pp. 1-5 (2006).

Wolniansky, P.W. et al., "V-BLAST: An Architecture for Realizing Very High Data Rates Over the Rich-Scattering Wireless Channel," URSI International Symposium on Signals, Systems, and Electronics, pp. 295-300 (1998).

Wübben, Dirk et al., "MMSE Extension of V-BLAST based on Sorted QR Decomposition," IEEE 58th Vehicular Technology Conference, vol. 1, pp. 508-512 (2003).

Jang et al., "An Efficient Symbol-Level Combining Scheme for MIMO Systems With Hybrid ARQ", IEEE Transactions on Wireless Communications, vol. 8, pp. 2443-2451, May 26, 2009.

Wu, J. et al., "The Performance of TCM 16-QAM with Equalization, Diversity, and Slow Frequency Hopping for Wideband Mobile Communications", 1998, Personal, Indoor and Mobile Radio Communication, vol. 3, pp. 1346-1350.

Zhou et al., "Subspace-Based (Semi-) Blind Channel Estimation for Block Precoded Space-Time OFDM," IEEE Transactions on Signal Processing, vol. 50, No. 5, May 2002, pp. 1215-1228.

Jang, et al., "Optimal Combining Schemes for MIMO Systems with Hybrid ARQ," 2007, IEEE International Symposium on Information Theory, Nice, France, Jun. 24-Jun. 29, 2007, pp. 2286-2290.

Zhang, Y. et al. "MMSE Linear Detector for Space-Time Transmit Diversity over Fast Fading Channels," The 14th IEEE 2003 International Sysmposium on Personal, Indoor and Mobile Radio Communication Proceedings, pp. 2388-2392, 2003.

Jie Li, et al., Soft Information Combining for Turbo-MIMO Retransmission, 2006 6th International Conference on ITS Telecommunication Processings, pp. 1346-1349.

\* cited by examiner $$\begin{bmatrix} y_1 \\ \vdots \\ y_{N_r} \end{bmatrix}_i = \begin{bmatrix} h_{11} & \cdots & h_{1N_t} \\ \vdots & \ddots & \vdots \\ h_{N_r 1} & \cdots & h_{N_r N_t} \end{bmatrix}_i \begin{bmatrix} x_1 \\ \vdots \\ x_{N_t} \end{bmatrix}_i + \begin{bmatrix} n_1 \\ \vdots \\ n_{N_r} \end{bmatrix}_i$$

$$\mathbf{y}_i = H_i \mathbf{x}_i + \mathbf{n}_i$$

FIG. 5

BIT-LEVEL COMBINING FOR MIMO SYSTEMS WITH HARQ AND/OR REPETITION CODING

CROSS-REFERENCE TO RELATED APPLICATIONS

This application claims the benefit under 35 U.S.C. §119 (e) of U.S. Provisional Application Nos. 60/820,414, filed Jul. 26, 2006, and 60/822,291, filed Aug. 14, 2006, which are incorporated herein by reference in their entirety.

BACKGROUND OF THE INVENTION

This invention relates to a technique for decoding received signal vectors in a multiple-input multiple-output (MIMO) data transmission or storage system, where a receiver may receive multiple signal vectors corresponding to a common digital sequence.

In a data transmission or storage system, it is desirable for information, often grouped into packets, to be accurately received at a destination. A transmitter at or near the source sends the information provided by the source via a signal or signal vector. A receiver at or near the destination processes the signal sent by the transmitter. The medium, or media, between the transmitter and receiver, through which the information is sent, may corrupt the signal such that the receiver is unable to correctly reconstruct the transmitted information. Therefore, given a transmission medium, sufficient reliability is obtained through careful design of the transmitter and receiver, and of their respective components.

There are many strategies for designing the transmitter and receiver. When the channel characteristics are known, the transmitter and receiver often implement signal processing techniques, such as transmitter precoders and receiver equalizers, to reduce or remove the effects caused by the channel and effectively recover the transmitted signal. Intersymbol interference (ISI) is one example of a channel effect that may be approximately eliminated using signal processing.

However, not all sources of signal corruption are caused from deterministic sources such as ISI. Non-deterministic sources, such as noise sources, may also affect the signal. Due to noise and other factors, signal processing techniques may not be entirely effective at eliminating adverse channel effects on their own. Therefore, designers often add redundancy in the data stream in order to correct errors that occur during transmission. The redundancy added to the data stream is determined based on an error correction code, which is another design variable. Common error correction codes include Reed-Solomon and Golay codes.

One straightforward way to implement a code is to use forward error correction (FEC). The transmitter encodes the data according to an error correction code and transmits the encoded information. Upon reception of the data, the receiver decodes the data using the same error correction code, ideally eliminating any errors. Therefore, "decoding" is hereinafter referred to as a method for producing an estimate of the transmitted sequence in any suitable form (e.g., a binary sequence, a sequence of probabilities, etc.).

Another way to implement a code for error correction is to use automatic repeat request (ARQ). Unlike FEC, ARQ schemes use error-detecting rather than error-correcting codes. The ARQ transmitter encodes data based on an error-detecting code, such as a cyclic redundancy check (CRC) code. After decoding the data based on the error-detecting code, if an error is detected, the receiver sends a request to the transmitter to retransmit that codeword. Thus, ARQ protocols require a forward channel for communication from transmitter to receiver and a back channel for communication from receiver to transmitter. Ultimately, the receiver will not accept a packet of data until there are no errors detected in the packet.

Finally, FEC and ARQ may be combined into what is known as hybrid automatic repeat request (HARQ). There are at least three standard HARQ protocols. HARQ type-I typically uses a code that is capable of both error-correction and error-detection. For example, a codeword may be constructed by first protecting the message with an error-detecting code, such as a CRC code, and then further encoding the CRC-protected message with an error-correcting code, such as a Reed-Solomon, Golay, convolutional, turbo, or low-density parity check (LDPC) code. When the receiver receives such a code, it first attempts FEC by decoding the error correction code. If, after error detection, there are still errors present, the receiver will request a retransmission of that packet. Otherwise, it accepts the received vector.

HARQ type-II and type-III are different from HARQ type-I, because the data sent on retransmissions of a packet are not the same as the data that was sent originally. HARQ type-II and type-III utilize incremental redundancy in successive retransmissions. That is, the first transmission uses a code with low redundancy. The code rate of a code is defined as the proportion of bits in the vector that carry information and is a metric for determining the throughput of the information. Therefore, the low redundancy code used for the first transmission of a packet has a high code rate, or throughput, but is less powerful at correcting errors. If errors are detected in the first packet, the second transmission is used to increase the redundancy, and therefore the error correcting capability, of the code. For example, if the first transmission uses a code with a code rate of 0.80, a retransmission may add enough extra redundancy to reduce the overall code rate to 0.70. The redundancy of the code may be increased by transmitting extra parity bits or by retransmitting a subset of the bits from the original transmission. If each retransmission can be decoded by itself, the system is HARQ type-III. Otherwise, the system is HARQ type-II.

It is beneficial for an ARQ or HARQ receiver to utilize data from multiple transmissions of a packet, because even packets that contain errors carry some amount of information about the transmitted packet. However, due to system complexity, and in particular decoder complexity, many practical schemes only use data from a small, fixed number of transmissions. Therefore, it would be desirable to provide a system or method for effectively utilizing information from an arbitrary number of transmitted packets that does not drastically increase the complexity of the system. Furthermore, it would be desirable to provide such a system that may utilize incremental redundancy.

SUMMARY OF THE INVENTION

Accordingly, systems and methods for reliable transmission in multiple-input multiple-output systems are disclosed, where a receiver obtains multiple signal vectors from the same transmit information, decodes each received signal vector, and combines the decoded vectors.

The transmitter, which has $N_t$ outputs, may send an $N_t$-dimensional signal vector to the receiver. The transmitted signal vector can be derived from an $mN_t$-bit sequence, b. The receiver, which has $N_r$ inputs, may receive an $N_r$-dimensional signal vector corresponding the $N_t$-dimensional transmit vector. In accordance with one aspect of the invention, the transmitter sends N signal vectors to the receiver, where each transmission includes at least some information about b. The receiver uses the received vectors to compute $\hat{b}$, a hard- or soft-estimate of b. The transmitter and receiver follow a common protocol to enable accurate communication. Two protocols that may be used are HARQ and repetition coding, or a combination of the two protocols. The present invention may advantageously be applied to HARQ type-II and HARQ type-III systems, or to any other protocol that uses incremental redundancy.

In some embodiments of the invention, when the receiver has N=1 received vectors corresponding to b, each received vector is separately decoded, using, for example, a maximum-likelihood (ML) decoder. In some embodiments, the receiver has N decoders for decoding the N signal vectors. The $i^{th}$ decoder, for i=1, ..., N, produces a soft-estimate, $\hat{b}_i$, of transmitted sequence b, where each component in $\hat{b}_i$ includes soft information for a bit of b in the form of a log-likelihood ratio (LLR). If the $i^{th}$ received signal vector does not have information about a particular bit in b, which may occur if a HARQ type-II or type-III protocol is used, the $i^{th}$ decoder may set the LLR to zero. This is appropriate, because a zero-value LLR provides no information as to the true value of a transmitted bit. Thus, for a transmitted sequence of $mN_t$ bits, each of the N decoders can produce $mN_t$ LLRs, $LLR_0, \ldots, LLR_{mN_t-1}$, where some of the LLRs may be purposefully set to zero.

Following decoding, the N $\hat{b}_i$s can be added together. Namely, the N $LLR_0$s can be added together, the N $LLR_1$s can be added together, etc. These summations produce a new set of LLR-like approximations, referred to as $\hat{b}$, of the transmitted bit sequence. This technique may be extended to receivers that include P decoders, where 1=P<N. In these embodiments, some of the decoders may be reused so that a total of N signal vectors are decoded.

In other embodiments of the present invention, the N=1 received signal vectors are first processed or equalized. The received vectors may be processed based on channel information associated with each received signal vector. The channel information may be represented by channel response matrices. The processed signals may then be decoded by P decoders, where 1=P=N. The decoders may be, for example, ML decoders, zero-forcing decoders, or minimum mean squared error decoders. By processing the received signal vectors, the decoders may be designed with lower complexity than that of decoders designed for unprocessed signals. At the output of the decoder corresponding to the $i^{th}$ decoded signal vector, soft information vector $\hat{b}_i$ may be available. In some embodiments, the soft information in each component of $\hat{b}_i$ may be an LLR. In these embodiments, the N sets of LLRs are added together to produce a new vector, $\hat{b}$, of LLR-like values.

The present invention has low complexity and a low hardware requirement. For a sequential protocol where P=1, such as HARQ, one vector may be decoded at any given time. Therefore, in this embodiment, only one decoder is necessary. After a first signal vector is decoded, the decoded vector, $\hat{b}_1$ may be stored in a memory. When a new signal vector is received and decoded as $\hat{b}_2$, $\hat{b}_2$ may be added to the stored information (in this case, $\hat{b}_1$). The memory may be updated to reflect the new sum, and the newly stored LLR-like value may be used when a third signal vector is received and decoded. Thus, the present invention may utilize all received signal vectors without a large memory requirement. This idea may be extended for P decoders, where P<N and P parallel calculations may be performed.

If a retransmission protocol is used, such as ARQ or HARQ, the receiver may request retransmissions of only a subset of the originally transmitted bits. For example, a receiver may request retransmissions of bits that cannot be clearly decoded as '1' or '0.' Upon receiving the retransmission request, the transmitter may puncture the original transmit bit sequence to send only those requested by the receiver. By retransmitting only necessary information, the throughput of the overall system may be improved.

BRIEF DESCRIPTION OF THE FIGURES

The above and other objects and advantages of the invention will be apparent upon consideration of the following detailed description, taken in conjunction with the accompanying drawings, in which like reference characters refer to like parts throughout, and in which:

FIG. 5 is a vector model of the system in FIG. 1;

DETAILED DESCRIPTION

The disclosed invention provides a technique for a multiple-input multiple-output data transmission or storage system to decode a signal vector at a receiver, where the receiver may receive multiple signal vectors corresponding to the same transmitted information.

Figure 1:
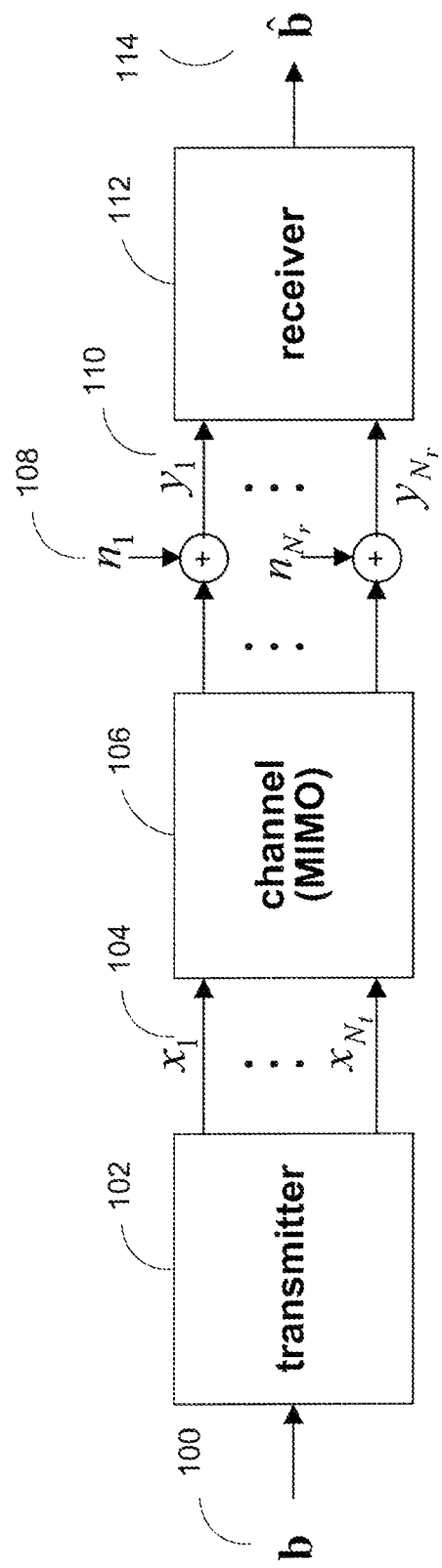
FIG. 1 is a high level block diagram of a multiple-input multiple-output data transmission or storage system.

FIG. 1 shows an illustration of a basic data transmission or storage system in accordance with one embodiment of the present invention. Data, typically grouped into packets, is sent from transmitter 102 to receiver 112. During transmission, the signals may be altered by a transmission medium, represented by channel 106, and additive noise sources 108. Transmitter 102 has $N_t$ outputs 104 and receiver 112 has $N_r$ inputs 110, so channel 106 is modeled as a multiple-input multiple-output (MIMO) system with $N_t$ inputs and $N_r$ outputs. The $N_t$ input and $N_r$ output dimensions may be implemented using multiple time, frequency, or spatial dimensions, or any combination of such dimensions.

Figure 2:
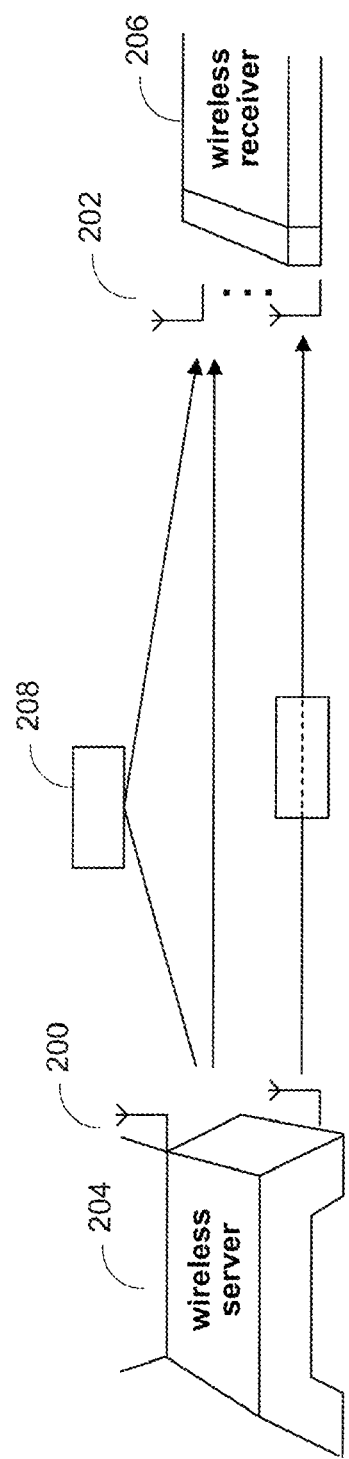
FIG. 2 is a wireless transmission system in accordance with one embodiment of the system in FIG. 1.

In one embodiment, FIG. 1 represents a wireless communication system, pictured in FIG. 2. In this embodiment, transmitter 102 is a wireless server 204, such as a commercial gateway modem, and receiver 112 is a wireless receiver 206, such as a commercial wireless computer adapter. Channel 106 is space 208 between wireless server 204 and wireless receiver 206, which obstructs and attenuates the signal due to at least multipath fades and shadowing effects. Typically, wireless communication systems use spatial dimensions to implement multiple dimensions in the form of multiple transmitting antennas 200 and receiving antennas 202.

Returning to FIG. 1, transmitter 102 prepares bit sequence 100 into signals capable of transmission through channel 106. For an uncoded system, bit sequence 100 is a binary message, where the message carries only information bits. Alternatively, for a coded system, bit sequence 100 may be an encoded version of the message. Thus, bit sequence 100 may have originated from a binary data source or from the output of a source encoder (not pictured).

Figure 3:
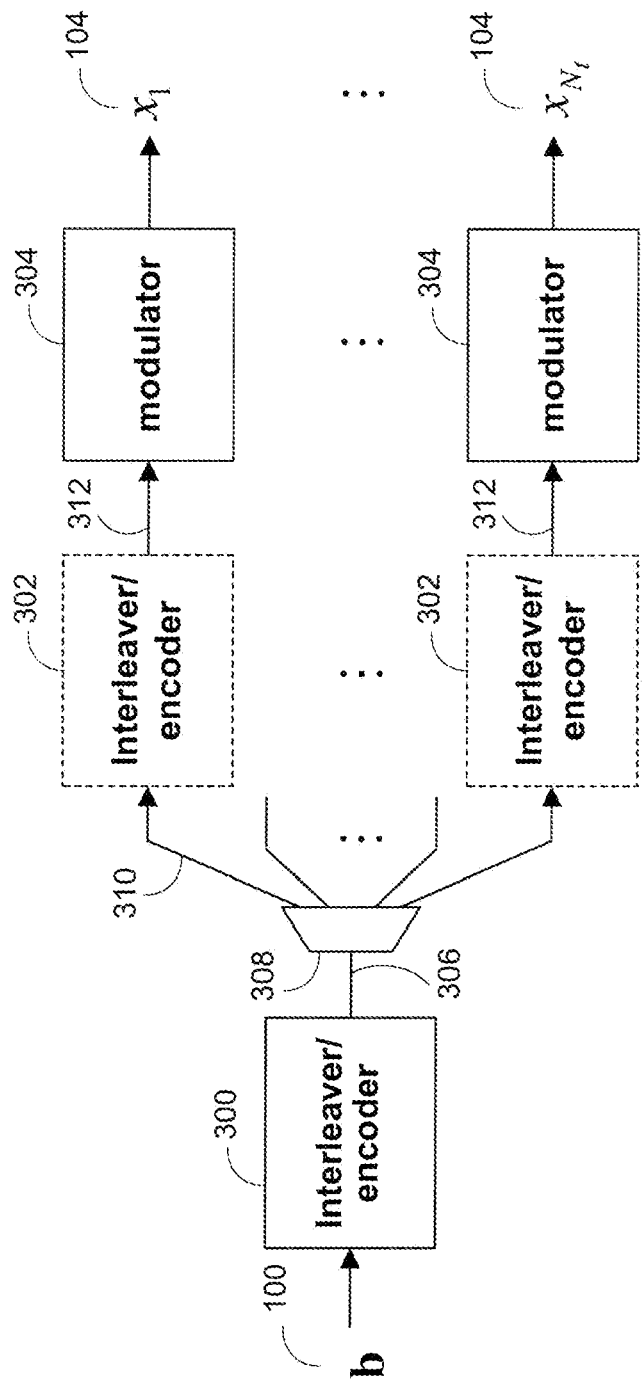
FIG. 3 is a block diagram of a transmitter.

One embodiment of transmitter 102 is shown in FIG. 3. Transmitter 102 converts bit sequence 100 into signals 104 appropriate for transmission through channel 106 (FIG. 1). Bit sequence 100 is passed through interleaver 300. Therefore, each bit in bit sequence 100 may be assumed to be independent of all other bits in bit sequence 100. Bit sequence 306 at the output of interleaver 300 is demultiplexed by demultiplexor 308 across $N_t$ paths 310. Each demultiplexed output 310 may or may not go through another interleaver and/or coding block 302, yielding bit sequences 312. Finally, bit sequences 312 are modulated with modulators 304, and are transmitted as signals $x_1, \ldots, x_{N_t}$, or x in vector form.

Figure 4A:
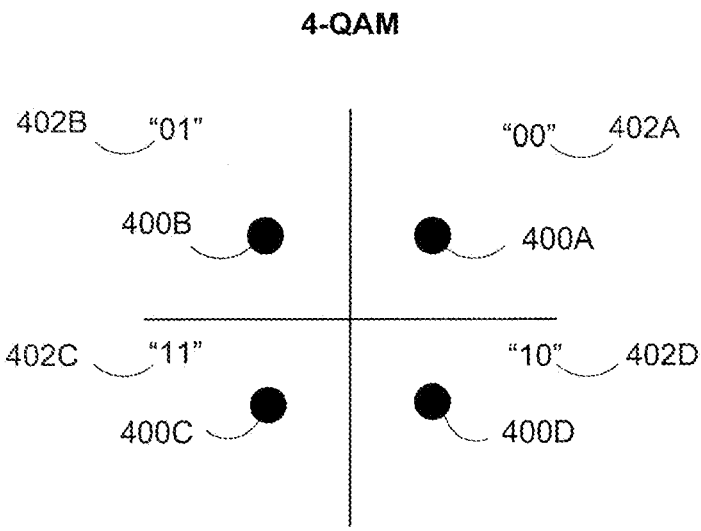
FIG. 4A is a signal constellation set for quadrature amplitude modulation with four signal points.

Modulators 304 group the incoming bits into symbols, which are mapped and converted to signals according to a signal constellation set and carrier signal. In one embodiment of the invention, modulator 304 uses quadrature amplitude modulation (QAM). Each symbol is mapped to a signal point in the QAM signal constellation set, where the signal points are differentiated from one another by phase and/or magnitude. For example, FIG. 4A shows a 4-QAM signal constellation set in a complex number plane. In this case, signal points 400A-400D are distinguishable only by phase. Each signal point represents a different two-bit symbol 402: 400A represents "00," 400B represents "01," 400C represents "11," and 400D represents "10." However, any other one-to-one mapping from symbol to signal point is valid.

Figure 4B:
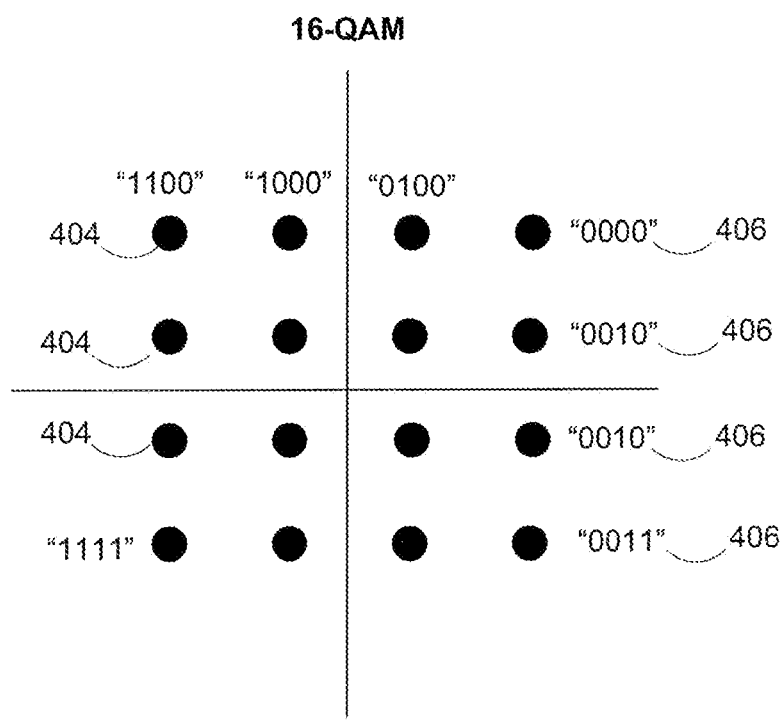
FIG. 4B is a signal constellation set for quadrature amplitude modulation with 16 signal points.

FIG. 4B shows a 16-QAM signal constellation set, where four-bit sequences 406 are combined into one symbol. Here, both the amplitudes and the phase of signal points 404 may vary. FIG. 4B shows a partial mapping from symbols 406 to signal points 404, where the each symbol is shown closest to its corresponding signal point. However, as before, any other mapping is possible. In general, an m-bit symbol may be mapped according to an M-QAM signal set, where $M=2^m$.

Therefore, for the transmitter configuration shown in FIG. 3, transmitter 102 is capable of transmitting $mN_t$ bits concurrently.

In accordance with one embodiment of the present invention, transmitter 102 sends signal vectors that include common information multiple times according to a protocol that is also known and followed by receiver 112. In some embodiments, transmitter 102 and receiver 112 may communicate using a retransmission protocol (e.g., HARQ type-I, type-III, type-III). If a HARQ type-I protocol is used, transmitter 102 may send a transmit signal vector, x, multiple times. If HARQ type-II or type-III is used, transmitter 102 may send multiple signal vectors (e.g., one of more $x_i$), where each signal vector is associated with a bit sequence $b_i$ that includes at least some information that can also be found in other $b_j$'s. The $b_i$'s, for instance, may be coded versions of a common bit sequence, b, and the code used to generate one of the coded sequences, $b_i$, may be different than the code used to generate another of the coded bit sequences. Alternatively, each $b_i$ may be derived from a common bit sequence, b, but may contain only a subset of the bits. This technique is referred to as puncturing, because the common bit sequence is punctured to produce other bit sequences. The code used to generate the common bit sequence, b, may be referred to as the mother code.

Depending on the protocol (e.g., HARQ type-I, type-II, type-III, etc.), there may be additional components in transmitter 102 that are not shown in FIG. 3. It should be understood that transmitter 102 may be altered in order to implement such protocols. For example, in embodiments where a retransmission protocol is used, transmitter 102 may include a buffer to store x, or equivalently bit stream 100, in the event that a retransmission is requested.

Even though $x_i$ is transmitted, receiver 112 in FIG. 1 actually receives $y_i$, where $$y_i = H_i x_i + n_i \quad 1 \leq i \leq N \tag{1}$$

For clarity, FIG. 5 shows the components of each vector in equation (1). Index i represents the ith instance that a signal vector $x_i$, corresponding to common information, is transmitted. $y_i$ is an $N_r \times 1$ signal vector, where each vector component is a signal received by one of the $N_r$ inputs of receiver 112. $H_i$ 500 is an $N_r \times N_t$ channel matrix that defines how channel 106 alters the corresponding transmitted vector, $x_i$. $n_i$ is an $N_r \times 1$ vector of additive noise. Note that the characteristics of channel 106, reflected in matrix 500, and noise sources 108 may be different for each instance i. Differences arise because each transmission of x occurs at a different time or through a different medium.

In one embodiment, noise sources 108 may be modeled as additive white Gaussian noise (AWGN) sources. In this case, noise sources 108 are independent and identically distributed (i.i.d). That is, the noise that affects any of the $N_r$ components in any $n_i$ does not affect the noise for any other component in $n_i$, and the noise at one time instant does not affect the noise at any other time instant. Also, all of the noise sources have the same probabilistic characteristics. Furthermore, each component of $n_i$ has zero mean and is random in terms of both magnitude and phase, where the magnitude and the phase are also independent. This type of noise source is called an i.i.d. zero mean circularly symmetric complex Gaussian (ZMC-SCG) noise source. If the variance of each component is $N_0$, then the conditional probability distribution function (pdf) of the received signal, Pr{y|x,H}, is given by $$Pr\{y \mid x, H\} = \frac{1}{(\pi N_0)^N} \exp\left\{-\frac{\|y - Hx\|^2}{N_0}\right\} \quad (2)$$

Equation (2) will be used with reference to maximum-likelihood decoding discussed in greater detail below in connection with FIG. 10.

Receiver 112 may use one or more of the N received signal vectors, $y_1, \ldots, y_N$ to determine the information that was transmitted. For simplicity, it will be assumed that there is a transmit bit sequence, b that fully represents the information being conveyed by transmitter 102. Therefore, receiver 112 may attempt to recover b by producing an estimate $\hat{b}$. Each of $y_1, \ldots, y_N$ may or may not contain relevant information for every bit in bit sequence b. Therefore, receiver 112 may generate $\hat{b}$ by utilizing information from multiple received signal vectors.

Figure 6A:
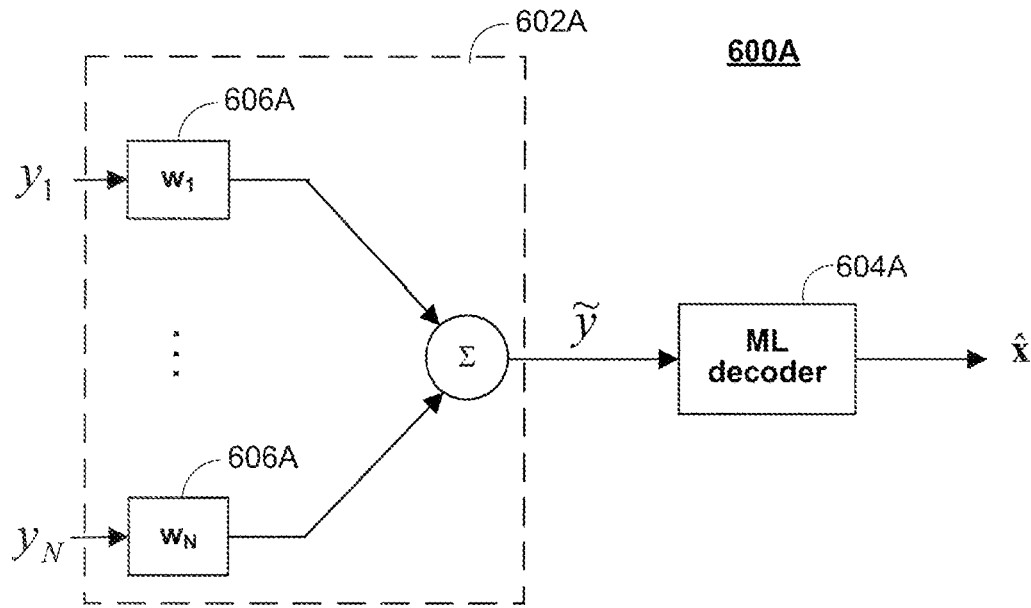
FIG. 6A-6B are block diagrams for decoding multiple receive signals in a single-input single-output (SISO) system.
Figure 6B:
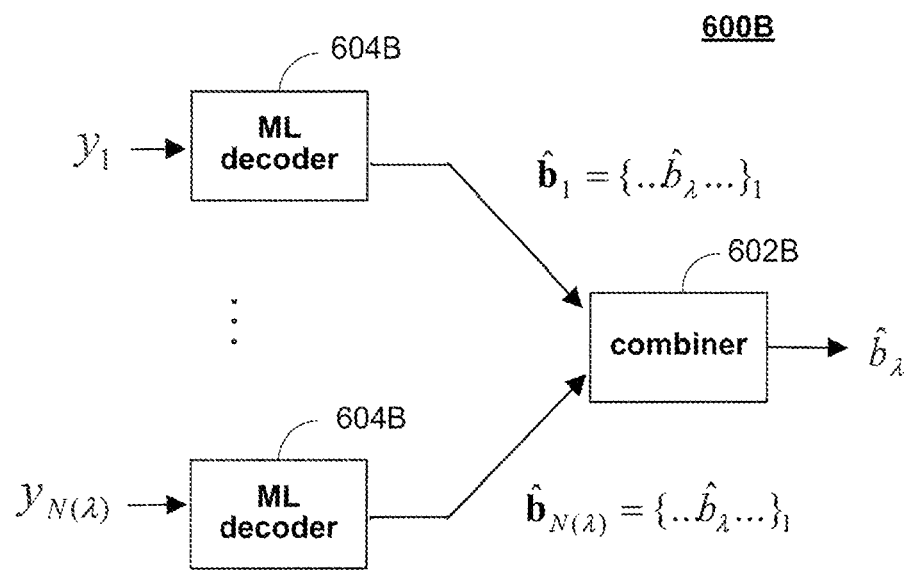

Single-input single-output (SISO) systems are a special case of MIMO systems in which $N_t = N_r = 1$. Block diagrams 600A and 600B in FIGS. 6A and 6B show two ways that multiple received signals may be used to estimate the transmitted information. Referring first to FIG. 6A, block diagram 600A shows combiner 600A for combining received signals and decoder 604A for decoding the combined signal. Because combiner 600A combines received signals that correspond to transmitted symbols, a receiver implementing block diagram 600A is hereinafter referred to as a symbol-level combining receiver. Combiner 602A may combine the received signals by weighted addition using weights 606A. Weights 606A may be chosen to maximize the signal-to-noise (SNR) ratio, a technique called maximal ratio combining (MRC). Decoder 604A may be a maximum-likelihood (ML) decoder or any other suitable decoder. Block diagram 600A may be used to produce an estimate, $\hat{b}$, of bit sequence b. Using MRC and ML decoding, block diagram 600A may produce the $\hat{b}$ with the highest probability of being the true transmitted bit sequence, b, for an AWGN channel.

Figure 7:
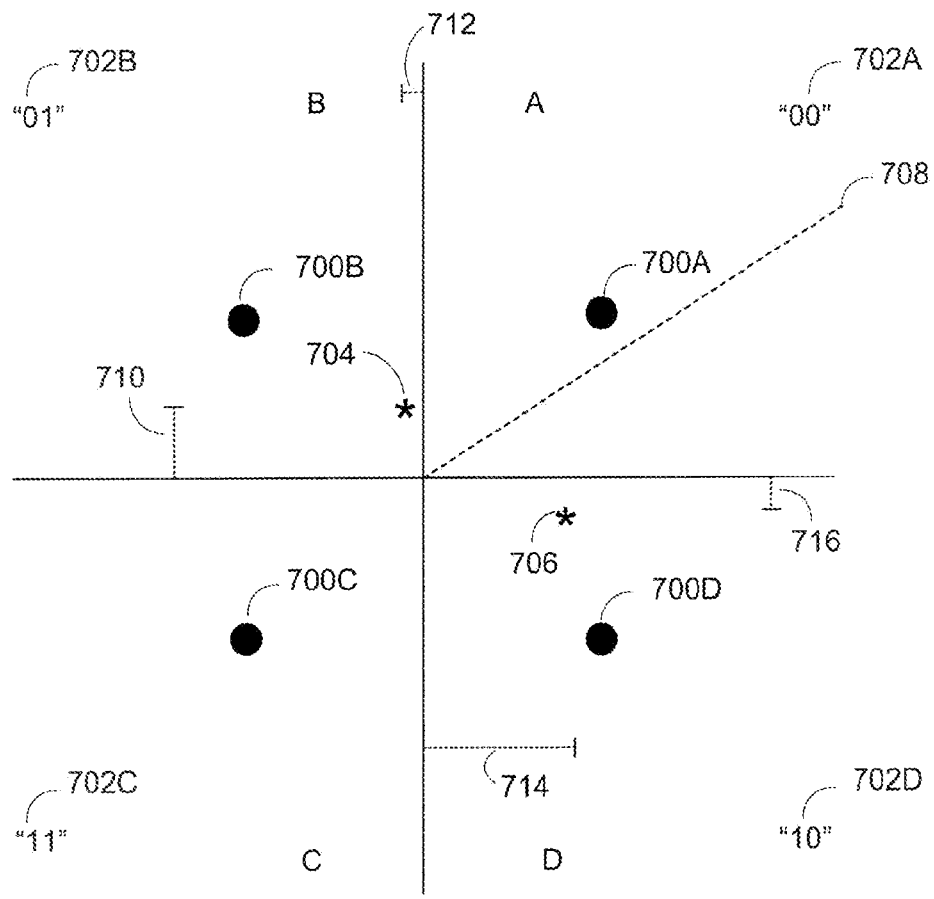
FIG. 7 is a diagram illustrating an example of symbol-level combining in a 4-QAM system using weighted addition or bit-level combining.

FIG. 7 may be used to illustrate the operation of a symbol-level combining receiver for SISO systems (e.g., receiver 112 (FIG. 1)) using the configuration of block diagram 600A. The signal constellation set is 4-QAM, which was described above in connection with FIG. 4A. Signal points 700A-700D represent the magnitude and phase of a transmitted symbol. For illustration purposes, assume that the transmitter is sending the symbol, "00" (702A), to the receiver using a HARQ type-I protocol. Assume, again for the purpose of illustration, that the channel does not attenuate, amplify, or alter the signal in any way. Therefore, ideally, the magnitude and phase of a received signal is the same as the transmitted signal. However, if due to additive noise, signal point 704 is actually received, it will be incorrectly decoded as "01," because it is closer to signal point 700B than 700A. Note that an ML decoder may make this decision if the noise is AWGN. The error-detecting code may then detect the presence of the bit error, resulting in a request for a retransmission. On the second transmission, signal point 706 may be received. If signal point 706 is decoded on its own, it may be incorrectly decoded as "10." However, by weighted addition, the resulting combined symbol falls approximately on dotted line 808. The combined symbol is now closest to signal point 700A and will be decoded correctly as "00."

Referring back to FIG. 6A, one disadvantage of the symbol-leveling combining configuration of block diagram 600A is that all of the transmitted symbols, $y_1, \ldots, y_N$, must correspond to the same transmit symbol for decoding to function properly. Otherwise, the symbol-level combining receiver does not produce the desired result illustrated above. However, the transmitted bit sequences, $b_1, \ldots, b_N$, may change from transmission to transmission if a HARQ type-II or type-III protocol is used, resulting in different values for $x_1, \ldots, x_N$. For example, a bit sequence of $\ldots 01[10]10 \ldots$ could be punctured to $\ldots \_[1\_1]01 \ldots$, where the underscores indicate bits that have been removed and the brackets indicate the current b being transmitted. Thus, in one transmission, the transmitter could transmit the symbol "00," while in another the transmitter could send the symbol "11." Thus, the symbol-level combining receiver of FIG. 6A cannot be used with HARQ type-II, HARQ type-III, or another protocol that utilizes incremental redundancy.

FIG. 6B shows a receiver configuration that may be used regardless of whether $y_1, \ldots, y_N$ correspond to the same transmit symbol, and may therefore be used with a HARQ type-II or HARQ type-III transmission protocol. Block diagram 600B of FIG. 6B includes multiple decoders 604B for decoding received signals, and combiner 602B for combining the decoded vectors. Note that the decoding and combining steps are reversed compared to block diagram 600A in FIG. 6A. Each of decoders 604B may produce a bit sequence, $\hat{b}_i$, for a received signal, $y_i$, where each component of $\hat{b}_i$ may be a soft or hard estimate of a transmitted bit. Some, though not all, of the estimated bit sequences, $\hat{b}_1, \ldots, \hat{b}_N$, may include an estimate for a particular bit in b, referred to as $b_\lambda$. Therefore, for convenience, block diagram 600B only shows components necessary for producing an estimate, $\hat{b}_\lambda$, of bit $b_\lambda$. Also for convenience and where appropriate, $y_1, \ldots, y_{N(\lambda)}$ refers to a subset of $y_1, \ldots, y_N$ that includes information about $b_\lambda$, where the subset is re-indexed from $1, \ldots, N(\lambda)$. (This definition similar applies to subset $\hat{b}_1, \ldots, \hat{b}_{N(\lambda)}, (\hat{b}_\lambda)_1, \ldots, (\hat{b}_\lambda)_{N(\lambda)}$, etc.) Accordingly, the only decoders shown in block diagram 600B are the $N(\lambda)$ decoders necessary for decoding $y_1, \ldots, y_{N(\lambda)}$. Decoders 604B may be maximum-likelihood decoders or any other suitable types of decoders.

After the $N(\lambda)$ signals are decoded by decoders 604B, bit estimates $(\hat{b}_\lambda)_i$ from each $\hat{b}_i$ may be combined to form $\hat{b}_\lambda$. Thus, $\hat{b}_\lambda$ may include information from all $N(\lambda)$ receptions that includes information about transmit bit $b_\lambda$. Combiner 602B may combine the estimates using any suitable function, such as weighted addition or unweighted addition. Combiner 602B may output $\hat{b}_\lambda$ as a hard estimate or a soft estimate. Since combiner 602B produces estimates of the transmitted bits rather than the transmitted symbols, the technique employed by FIG. 6B and other embodiments of the present invention (e.g., FIGS. 9 and 10-13) is hereafter referred to as bit-level combining.

The illustration in FIG. 7 may again be used to show the operation of the bit-level decoding scheme of FIG. 6B. With an AWGN channel, ML decoders, and a transmit symbol of "00" in consecutive transmissions, received signal point 704 may be decoded incorrectly as "01" by one of decoders 604B. Similarly, received signal point 706 may be decoded incorrectly as "10" by another of decoders 604B. However, if decoders 604B generate soft information, combiner 904 will still produce the correct 2-bit sequence. Looking at the zeroth (rightmost) bit only, the zeroth bit of point 704 would be incorrectly decoded as '1.' However, decoder 604B will produce this result with low certainty (e.g., low LLR magnitude), because signal point 704 is close to the boundary between quadrant A, the correct region, and quadrant B. (Equivalently, distance 712 is small.) The zeroth bit of point 706 will be correctly decoded as '0,' and with high certainty, since distance 714 is relatively large. By combining the decoding results of 704 and 706, the higher-certainty value will dominate. Thus, the zeroth bit will be decoded correctly as '0.'

Similarly, by comparing distances 710 and 716, it may be deduced that the first bit will also be correctly decoded as '0.' Thus, using the receiver configuration of FIG. 6B, the received symbol may be correctly decoded as "00."

Figure 8:
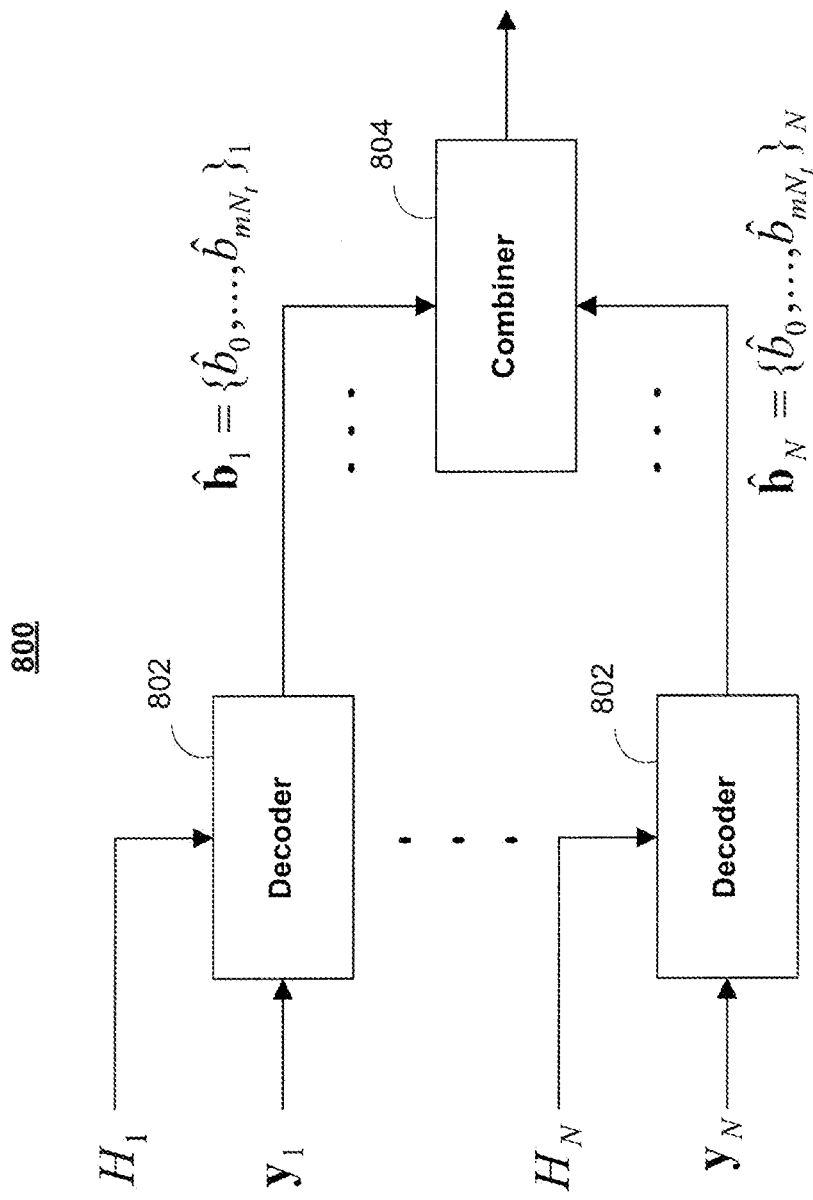
FIG. 8 is high level block diagram of a multiple-input multiple-output bit-level combining receiver.

The bit-level scheme illustrated by block diagram 600B may be extended to the general MIMO case. Referring to FIG. 8, block diagram 800 illustrates a receiver configuration for a MIMO system in accordance with one embodiment the present invention. Here, N decoders are shown for the N received signal vectors, rather than showing only N($\lambda$) decoders. The N received signal vectors are first decoded by decoders 802, producing N estimates, $\hat{b}_1, \ldots, \hat{b}_N$. A component of $\hat{b}_i$, or $(\hat{b}_\lambda)_i$, may be a soft- or hard-estimate of a transmitted bit, $b_\lambda$, if $\hat{b}_i$ contains information about $b_\lambda$. Although decoders 802 may produce a hard or soft output, soft information is generally preferable, because it may yield better decoding results. Recall that, as described above in connection with FIG. 3, there may be $mN_t$ bits in the transmitted bit sequence. Therefore, there may be up to $mN_t$ components in each $\hat{b}_i$. It should be understood that not all $\hat{b}_i$ may have information about every bit in b. Regardless, decoders 802 may output $mN_t$ estimates for $\hat{b}_i = \{\hat{b}_0, \ldots, \hat{b}_{mN_t-1}\}_i$, where each $(\hat{b}_\lambda)_i$ corresponds to transmit bit $b_\lambda$. If no information is available about a particular bit, then the value of the corresponding $(\hat{b}_2)_i$ may be set to a value that provides no information about $b_\lambda$. In other embodiments, each $\hat{b}_i$ may include a different number of bits, or a subset of the bits in a $\hat{b}_i$ may be used to decode a different set of transmit information.

Following decoding, combiner 804 combines the outputs of decoders 802. Combiner 804 combines only the soft-information that corresponds to the same transmitted bit, $b_\lambda$. Thus, the N sets of up to $mN_t$ estimates of $b_\lambda$ are combined into a single set of $mN_t$ estimates. For each $b_\lambda$, combiner 804 combines all corresponding soft-information according to some function, $$f_\lambda((\hat{b}_0)_1, \ldots, (\hat{b}_0)_N),$$

to produce a combined estimate of $b_\lambda$ that has information from every received signal vector that carries information about $b_\lambda$. Each combining function may be a weighted sum, an unweighted sum, or any other suitable mathematical function. The result of the computation is another soft or hard estimate for each bit of the transmitted sequence. Combiner 804 may then output the result directly, scale the result by some amount, convert combined soft information to hard decisions, or convert the result to another soft-bit metric.

The receiver illustrated in FIG. 8 shows all N received vectors and N channel response matrices as inputs into their respective decoding metric calculators. However, not all N signal vectors are necessarily provided to the decoders at the same time, and the receiver is not required to wait until after all N signal vectors are received to begin operating. Instead, the receiver shown in FIG. 8 merely illustrates that the system is capable of decoding based on information from all N transmissions of common information. In fact, in some embodiments, such as when a HARQ protocol is used, a single decoder may be used to accept one signal vector at a time, and information on the previous transmissions may be obtained from some other source.

Figure 9:
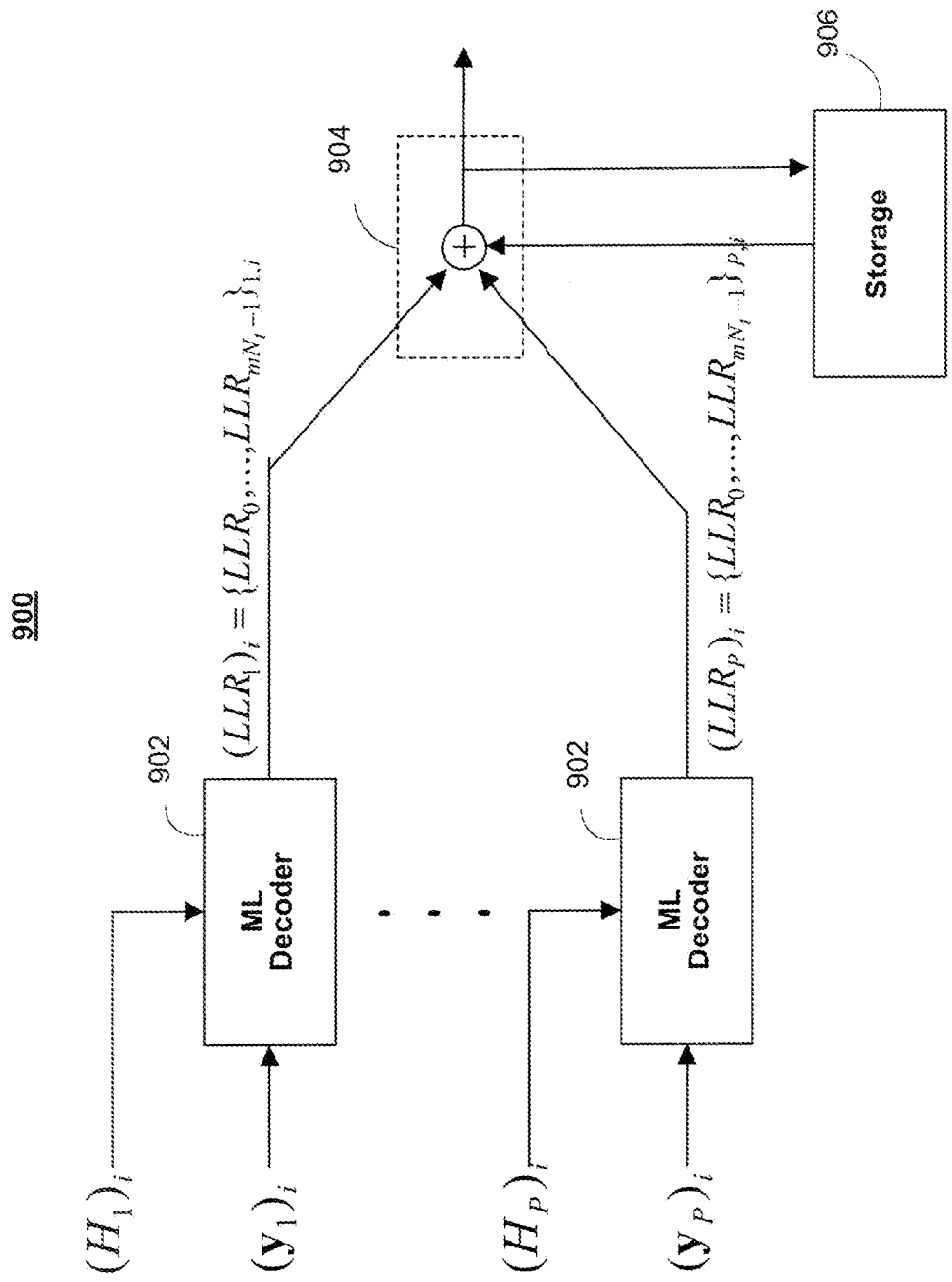
FIG. 9 is one embodiment of the receiver of FIG. 8.

Referring now to FIG. 9, block diagram 900 shows a more detailed embodiment of block diagram 800 (FIG. 8) in accordance with one embodiment the present invention. The variable, P, where P≤N, is hereinafter defined to be the number of signal vectors that are received substantially at the same time (e.g., concurrently, within a given amount of time, etc.). For simplicity, it is assumed that P is divisible by N. In this scenario, there are a total of N/P transmissions of P signal vectors. The present invention, however, is not limited to this constrained situation. When the first set of P signal vectors is received, they are decoded by the P ML decoders 902. ML decoders 902 may produce soft information for each transmitted bit in the form of a log-likelihood ratio (LLR). An LLR is a soft-bit metric often associated with ML decoding, where the sign of the LLR indicates the the most likely value of the transmitted signal (1 if positive, 0 if negative), and the magnitude of the LLR indicates the strength or confidence of the decision. Thus, each of the P decoders produces $mN_t$ LLR values. If a received signal vector does not carry information about a particular bit, decoder 902 may set the LLR to zero, since an LLR of zero does not favor $b_\lambda = 0$ or $b_\lambda = 1$. The P sets of $mN_t$ LLRs may be summed by adder 904. This produces a set of LLR-like values corresponding to: $\{(\hat{b}_0)_1 + \ldots + (\hat{b}_0)_N, \ldots, (\hat{b}_{nN_t-1})_1 + \ldots + (\hat{b}_{mN_t-1})_N\}$. The result of the summations, as is, may be output as an LLR-like estimate of the transmit bit sequence. The result may also be stored in storage 906. Thus, when P more signal vectors are received and decoded, the P sets of $mN_t$ LLRs may be added together, and may also be added with the stored LLR-like information corresponding to the first P signal vectors. The new sum may then be saved in storage 906 by overwriting the previous sum, and may be used by adder 904 when a third set of signal vectors is received. In this way, all of the received information may be utilized in estimating the transmit signal vector without a large memory requirement. Furthermore, computations performed on previous transmissions do not need to be recomputed.

To generalize, before the $i^{th}$ reception of P signal vectors, soft information for the $(i-1) \times P$ previously received signal vectors may have already been calculated and stored in storage 906. Then, when the $i^{th}$ set of P signal vectors is received, they are decoded by the P ML decoders 902. The resulting P sets of LLRs and the $(i-1)^{st}$ sum stored in storage 906 may be summed by adder 904. Therefore, adder 904 produces soft information that utilizes information from all i×P receptions of the common transmit signal vector. Since only one sum needs to be stored, the memory requirement for storage 904 may only be equal to:

Storage capacity (in bits)=(bits in $b$)×(bits used to store each LLR).

For example, if b is 1024 bits long, and eight bits are used to store soft information for each bit in b, storage 1006 need only have a storage capacity of 8 KB.

It can be shown a that a MIMO bit-level combining receiver with ML decoding, such as block diagram 900 of FIG. 9, has close to optimal decoding performance. Thus, a receiver using this configuration may be referred to as an optimal receiver. An optimal receiver scheme is hereinafter defined to be one that, given the N received signal vectors, chooses the signal vector that has the highest probability of being the actual transmit signal vector in the presence of AWGN. This is considered optimum, because all information from the N received signals is used fully. Mathematically, an optimum decoding scheme chooses the signal vector, $\hat{x}$, that maximizes $$Pr\{\hat{x}|y_1, \ldots, y_N, H_1, \ldots, H_N\}. \qquad (3)$$

Figure 10A:
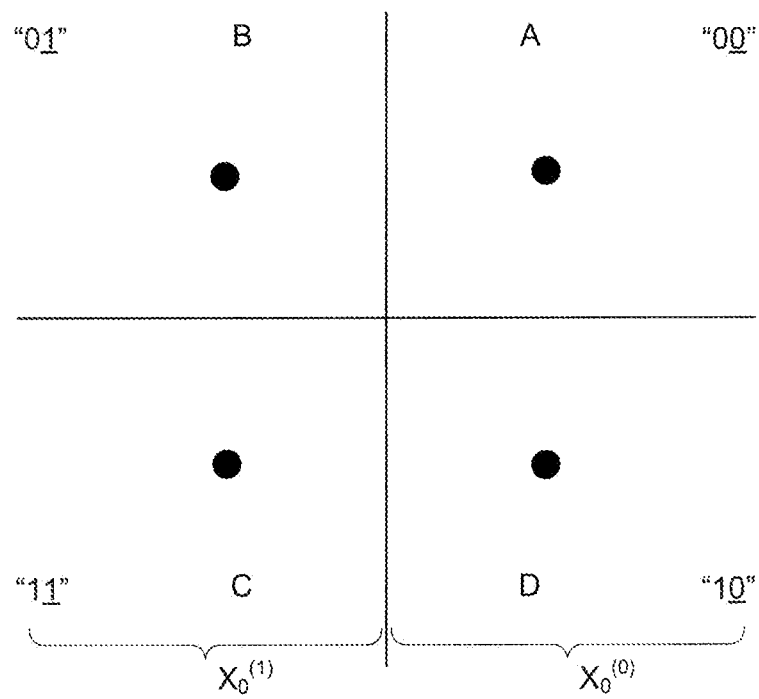
FIG. 10A-10B show subsets of signal points in a 4-QAM signal constellation set.
Figure 10B:
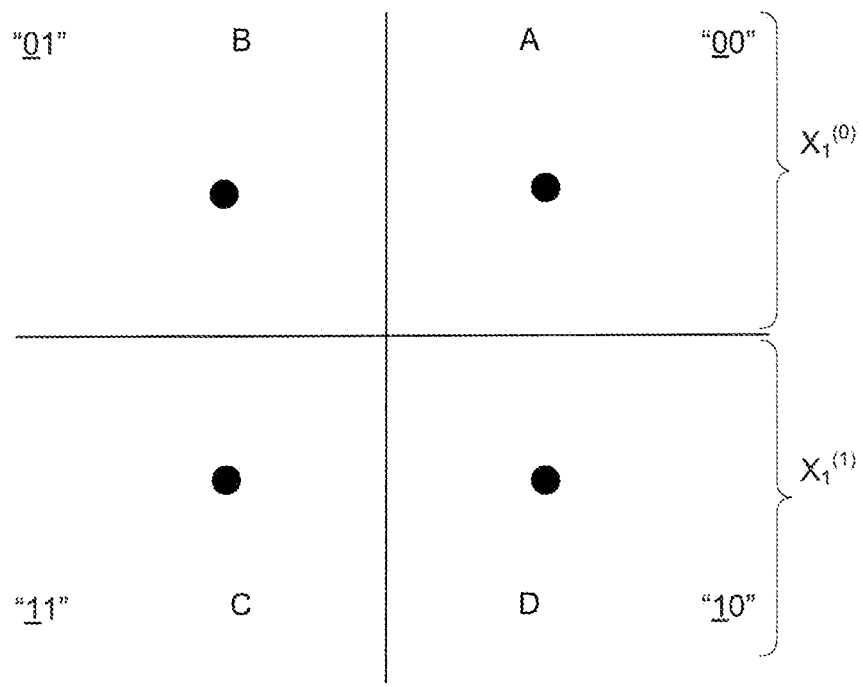

Therefore, a receiver that maximizes equation (3) is essentially a maximum-likelihood decoder. For a MIMO system, where the N received symbols are given by $$y_i = Hx_i + n_i, \ 1 \le i \le N, \qquad (4)$$

equation (3) may be maximized by computing an ML LLR. A nearly optimum LLR output, $LLR_{opt}$, for $b_\lambda$ is given by $$LLR_{opt} = \min_{\hat{x}^{(0)} \in X_\lambda^{(0)}} \left\{ \sum_{i=1}^{N(\lambda)} \|y_i - H_i \hat{x}_i^{(0)}\|^2 \right\} - \min_{\hat{x}^{(1)} \in X_\lambda^{(1)}} \left\{ \sum_{i=1}^{N(\lambda)} \|y_i - H_i \hat{x}_i^{(1)}\|^2 \right\}, \quad (5)$$

which will be derived below in equations (6) through equation (13). The variable $X_\lambda^{(j)}$ in equation (5) denotes a subset of a signal constellation set whose $\lambda^{th}$ bit equals j for j=0,1. For example, FIGS. 10A and 10B illustrate the four possible subsets for a 4-QAM signal constellation set. 4-QAM is discussed in greater detail above in connection with FIG. 4A. In each figure, the bit corresponding to $b_\lambda$ is underlined for emphasis. Note that, as is consistent with the definition of the subset, the emphasized bit is the same for all members of a subset. Thus, the signal point in quadrant A belongs in subsets $X_0^{(0)}$ and $X_1^{(0)}$. Similarly, the signal point in quadrant B belongs in subsets $X_0^{(1)}$ and $X_1^{(0)}$, etc. Accordingly, the first term in equation (5) minimizes a quantity over a subset of signal vectors that include bit $b_\lambda=0$. The second term in equation (5) minimizes over a subset of signal vectors that include bit $b_\lambda=1$.

An optimal LLR can be derived as follows:

$$LLR_{opt} = L(b_\lambda | y_1, \ldots, y_{N(\lambda)}, H_1, \ldots, H_{N(\lambda)}) \quad (6)$$

$$= \ln \frac{Pr\{b_\lambda = 1 | y_1, \ldots, y_{N(\lambda)}, H_1, \ldots, H_{N(\lambda)}\}}{Pr\{b_\lambda = 0 | y_1, \ldots, y_{N(\lambda)}, H_1, \ldots, H_{N(\lambda)}\}} \quad (7)$$

$$= \ln \frac{\sum_{\hat{x}^{(1)} \in X_\lambda^{(1)}} Pr\{y_1, \ldots, y_{N(\lambda)} | \hat{x}_1^{(1)} \ldots, \hat{x}_{N(\lambda)}^{(1)}, H_1, \ldots, H_{N(\lambda)}\}}{\sum_{\hat{x}^{(0)} \in X_\lambda^{(0)}} Pr\{y_1, \ldots, y_{N(\lambda)} | \hat{x}_1^{(0)} \ldots, \hat{x}_{N(\lambda)}^{(0)}, H_1, \ldots, H_{N(\lambda)}\}} \quad (8)$$

$$= \ln \frac{\sum_{\hat{x}^{(1)} \in X_\lambda^{(1)}} \prod_{i=1}^{N(\lambda)} Pr\{y_i | \hat{x}_i^{(1)}, H_i\}}{\sum_{\hat{x}^{(0)} \in X_\lambda^{(0)}} \prod_{i=1}^{N(\lambda)} Pr\{y_i | \hat{x}_i^{(0)}, H_i\}} \quad (9)$$

$$= \ln \frac{\sum_{\hat{x}^{(1)} \in X_\lambda^{(1)}} \prod_{i=1}^{N(\lambda)} \frac{1}{\pi^{N(\lambda)r}} \exp\{-\|y_i - H_i \hat{x}_i^{(1)}\|^2\}}{\sum_{\hat{x}^{(0)} \in X_\lambda^{(0)}} \prod_{i=1}^{N(\lambda)} \frac{1}{\pi^{N(\lambda)r}} \exp\{-\|y_i - H_i \hat{x}_i^{(0)}\|^2\}} \quad (10)$$

$$= \ln \frac{\sum_{\hat{x}^{(1)} \in X_\lambda^{(1)}} \exp\left\{-\sum_{i=1}^{N(\lambda)} \|y_i - H_i \hat{x}_i^{(1)}\|^2\right\}}{\sum_{\hat{x}^{(0)} \in X_\lambda^{(0)}} \exp\left\{-\sum_{i=1}^{N(\lambda)} \|y_i - H_i \hat{x}_i^{(0)}\|^2\right\}} \quad (11)$$

Equations (6) and (7) follow from the definition of the log-likelihood ratio. Equation (8) is reached by applying Bayes' Theorem, a technique known in the art, to equation (7). Then, the equation is written in terms of transmitted signal vectors, $\hat{x}_i$, instead of transmitted bits, $b_\lambda$. That is, rather than writing the numerator of equation (7) in terms of $b_\lambda=1$ itself, it is written in terms of the signal vectors that include $b_\lambda=1$, which is the subset $X_\lambda^{(1)}$. Then, equation (10) follows from the statistical independence between each received signal vector. That is, for independent events A and B, $Pr(A \cap B)=Pr(A)Pr(B)$.

In equation (8) through (11) above, $\hat{X}^{(j)}=\{\hat{x}_1^{(j)}, \ldots, \hat{x}_{N(\lambda)}^{(j)}\}$, denotes all valid combinations that signal vectors, $\hat{x}_1^{(j)}, \ldots, \hat{x}_{N(\lambda)}^{(j)}$, may equal. The bits of each $\hat{x}_j^{(j)}$ are constrained in two ways. First, the bit in each $\hat{x}_j^{(j)}$ that corresponds to $b_\lambda$ are constrained to equal j. This first constraint reduces the possible values of $\hat{x}_j^{(j)}$ to the set, $X_\lambda^{(j)}$. Secondly, other bits in each $\hat{x}_j^{(j)}$ may be equal, since $\tilde{x}_1^{(j)}, \ldots, x_{N(\lambda)}^{(j)}$ may have more information in common than just $b_\lambda$. Therefore, the neighboring bits of $b_\lambda$ also constrain the set, $\hat{X}^{(j)}=\{\hat{x}_1^{(j)}, \ldots, \hat{x}_{N(\lambda)}^{(j)}\}$ in equations (8) through (11) and in equations (12) and (13) below.

A decoder could directly implement equation (11) above to compute truly optimal LLRs. However, this would require the decoder to compute the summation of exponential functions and a logarithm, which are complex calculations. Thus, the approximation, $\Sigma_i \log a_i \approx \log \max_i a_i$, is utilized to simplify equation (11), resulting in an LLR equation given by, $$LLR_{opt} \simeq \ln \frac{\max_{\hat{x}^{(1)} \in X_\lambda^{(1)}} \exp\left\{-\sum_{i=1}^{N(\lambda)} \|y_i - H_i \hat{x}_i^{(1)}\|^2\right\}}{\max_{\hat{x}^{(0)} \in X_\lambda^{(0)}} \exp\left\{-\sum_{i=1}^{N(\lambda)} \|y_i - H_i \hat{x}_i^{(0)}\|^2\right\}} \quad (12)$$

-continued $$= \min_{\hat{x}^{(0)} \in X_\lambda^{(0)}} \left\{ \sum_{i=1}^{N(\lambda)} \|y_i - H_i \hat{x}_i^{(0)}\|^2 \right\} - \min_{\hat{x}^{(1)} \in X_\lambda^{(1)}} \left\{ \sum_{i=1}^{N(\lambda)} \|y_i - H_i \hat{x}_i^{(1)}\|^2 \right\}, \quad (13)$$

Equation (13) results from plugging in equation (2), the conditional probability distribution function (PDF) for an AWGN channel. Note that, as expected) this is the same equation as equation (5).

A bit-level combining receiver, such as receiver 900 in FIG. 9 may represent a near-optimum system for decoding a signal vector based on N receptions of the transmit vector. For MIMO systems, the LLR for a bit, $b_\lambda$ may be calculated as follows:

$$LLR_{BLC-ML,opt} = \sum_{i=1}^{N(\lambda)} LLR_i \quad (14)$$

$$= \sum_{i=1}^{N(\lambda)} L(b_\lambda | y_i, H_i) \quad (15)$$

$$= \sum_{i=1}^{N(\lambda)} \ln \frac{Pr\{b_\lambda = 1 | y_i, H_i\}}{Pr\{b_\lambda = 0 | y_i, H_i\}} \quad (16)$$

$$= \sum_{i=1}^{N(\lambda)} \ln \frac{\sum_{\hat{x}_i^{(1)} \in X_\lambda^{(1)}} Pr\{y_i | \hat{x}_i^{(1)}, H_i\}}{\sum_{\hat{x}_i^{(0)} \in X_\lambda^{(0)}} Pr\{y_i | \hat{x}_i^{(0)}, H_i\}} \quad (17)$$

$$= \sum_{i=1}^{N(\lambda)} \ln \frac{\sum_{\hat{x}_i^{(1)} \in X_\lambda^{(1)}} \frac{1}{\pi^{N_r}} \exp\{-\|y_i - H_i \hat{x}_i^{(1)}\|^2\}}{\sum_{\hat{x}_i^{(0)} \in X_\lambda^{(0)}} \frac{1}{\pi^{N_r}} \exp\{-\|y_i - H_i \hat{x}_i^{(0)}\|^2\}} \quad (18)$$

where $LLR_i$ denotes the LLR for bit $b_\lambda$ of $y_i$, the $i^{th}$ received signal vector. Equation (14) follows from the receiver configuration of block diagram 900 (FIG. 9), where N separate LLRs are calculated by decoders 902 and summed by adder 904. Note that only the $N(\lambda)$ LLRs with information about $b_\lambda$ are included in the summation of equation (14), because any remaining LLRs are set to zero and would not affect the result of the summation. Equations (15) and (16) follow from the definition of the LLR. Equation (17) is reached by first applying Bayes' Theorem to equation (16), which is known in the art. Then, the equation is written in terms of transmitted symbols, $\hat{x}$, instead of transmitted bits, $b_k$. Finally, equation (18) results from plugging in equation (2), the PDF for an AWGN channel.

As described above, an implementation of equation (18) could be highly complex. Therefore, the $\Sigma_i \log a_i \approx \log \max_i a_i$ approximation is applied to equation (18) to simply the equation to, $$LLR_{BLC-ML,opt} \approx \sum_{i=1}^{N(\lambda)} \ln \frac{\max_{\hat{x}_i^{(1)} \in X_\lambda^{(1)}} \exp\{-\|y_i - H_i \hat{x}_i^{(1)}\|^2\}}{\max_{\hat{x}_i^{(0)} \in X_\lambda^{(0)}} \exp\{-\|y_i - H_i \hat{x}_i^{(0)}\|^2\}} \quad (19)$$

$$= \sum_{i=1}^{N(\lambda)} \left\{ \min_{\hat{x}_i^{(0)} \in X_\lambda^{(0)}} \|y_i - H_i \hat{x}_i^{(0)}\|^2 - \min_{\hat{x}_i^{(1)} \in X_\lambda^{(1)}} \|y_i - H_i \hat{x}_i^{(1)}\|^2 \right\}, \quad (20)$$

A bit-level combining receiver, such as a receiver implementing block diagram 900 of FIG. 9, could calculate LLRs according to equation (20). This would result in a receiver that may only need to calculate distances and low complexity arithmetic operations. For high signal-to-noise ratios (SNRs), the minimizing vector value $\hat{x}_j^{(j)}$ may be equal for all $i=1, \ldots, N$, for $j=0,1$, respectively. Therefore, the LLR becomes, $$LLR_{BLC-ML} = \sum_{i=1}^{N(\lambda)} \left\{ \min_{\hat{x}_i^{(0)} \in X_\lambda^{(0)}} \|y_i - H_i \hat{x}_i^{(0)}\|^2 \right\} - \quad (21)$$

$$\sum_{i=1}^{N(\lambda)} \left\{ \min_{\hat{x}_i^{(1)} \in X_\lambda^{(1)}} \|y_i - H_i \hat{x}_i^{(1)}\|^2 \right\}$$

$$\approx \min_{\hat{x}_i^{(0)} \in X_\lambda^{(0)}} \left\{ \sum_{i=1}^{N(\lambda)} \|y_i - H_i \hat{x}_i^{(0)}\|^2 \right\} - \quad (22)$$

$$\min_{\hat{x}_i^{(1)} \in X_\lambda^{(1)}} \left\{ \sum_{i=1}^{N(\lambda)} \|y_i - H_i \hat{x}_i^{(1)}\|^2 \right\}$$

$$\approx LLR_{opt}. \quad (23)$$

Thus, when the SNR is high, bit-level combining is an optimal form of decoding multiple received symbols in a SISO system. Even when the SNR is low, bit-level combining may still have high, or even nearly optimal, performance. The optimal LLR given by equation (13) and the bit-level combining LLR given by equation (20) may differ due to the effect of the constraints on $\hat{X}^{(j)} = \{\hat{x}_1^{(j)}, \ldots, \hat{x}_{N(\lambda)}^{(j)}\}$. These differences may be effectively removed by interleaving a transmit bit sequence (e.g., using interleaver 300 in FIG. 3) after, for example, puncturing the bit sequence. Therefore, for low SNR, interleaving the transmit bit sequence may provide high, or even nearly optimal decoding performance.

Figure 11:
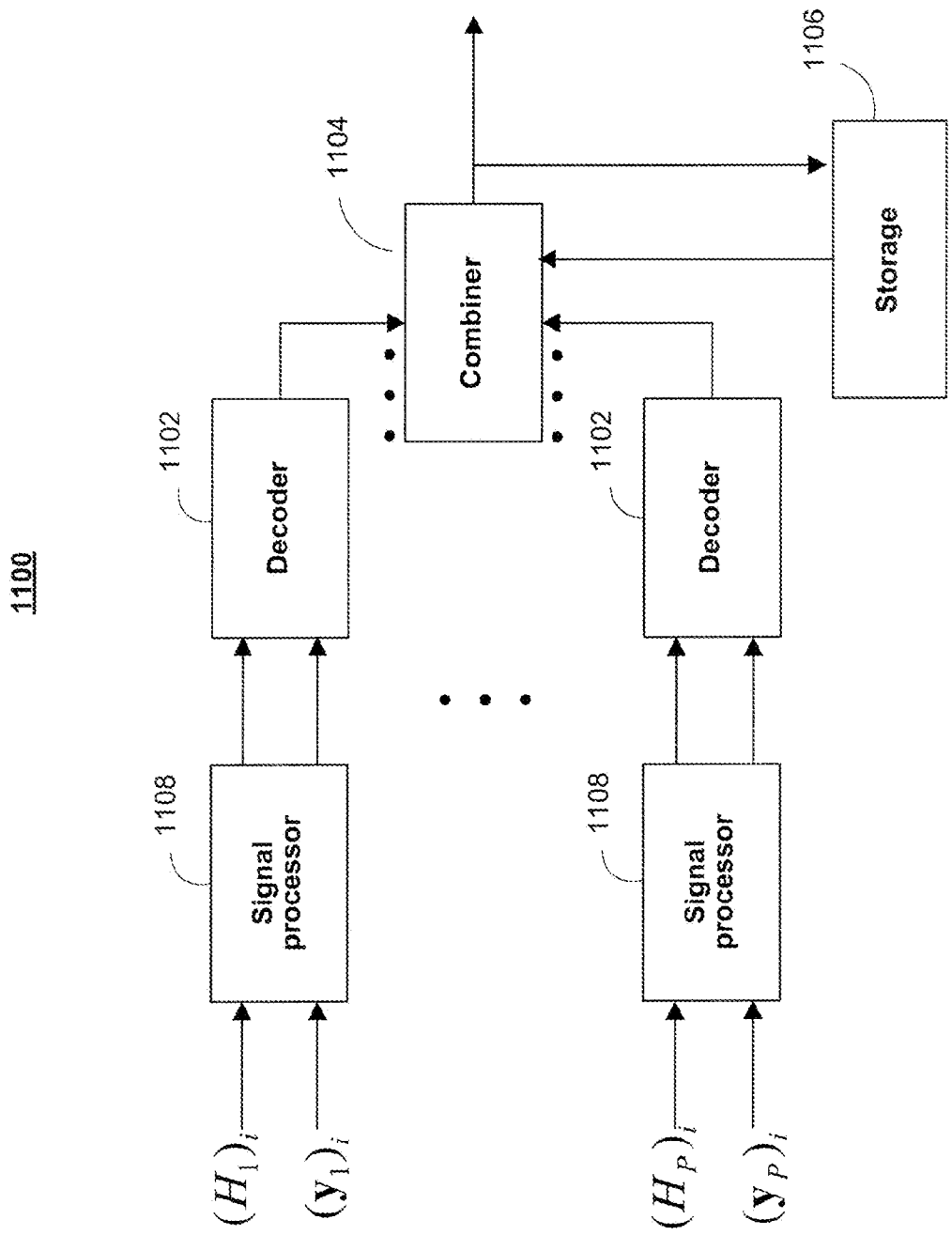
FIG. 11 is high level block diagram of a multiple-input multiple-output bit-level combining receiver.

Referring now to FIG. 11, block diagram 1100 shows an alternative embodiment of a bit-level combiner in accordance with one embodiment the present invention. In block diagram 1100, the received signal vectors are processed by signal processor 1108 prior to decoding. The processed signal vector may be decoded using a low complexity decoder. Signal processor 1108 may use channel information (e.g., $H_1, \ldots, H_P$) in order to process or equalize the received signal vectors, $y_1, \ldots, y_P$. In some embodiments, signal processor 1108 includes a channel preprocessor to convert the channel information to a format that is suitable for processing the received signal vectors. Signal processor 1108 may be, for example, a zero-forcing (ZF) equalizer a minimum mean squared error (MMSE) equalizer, or any other suitable linear equalizer.

After processing the received signal vectors, the processed signal vectors are decoded by decoders 1102. Decoders 1102 may output soft-information or hard-information for each bit. However, soft-information is generally preferable, because it may yield better decoding results. Following decoding, combiner 1104 combines the outputs of decoders 1102 by computing a weighted sum, computing an unweighted sum, or by computing any other suitable mathematical function. Combiner 1104 may also combine information stored in storage 1106 corresponding to soft information from previously received signal vectors. The result of the computation is another soft or hard estimate for each bit of the transmitted sequence. Combiner 1104 may then output the result directly, scale the result by some amount, convert combined soft information to hard decisions, or convert the result to another soft-bit metric. The output of combiner 1104, or a processed version of the output of combiner 1104, may be stored in storage 1106 for future use.

Figure 12:
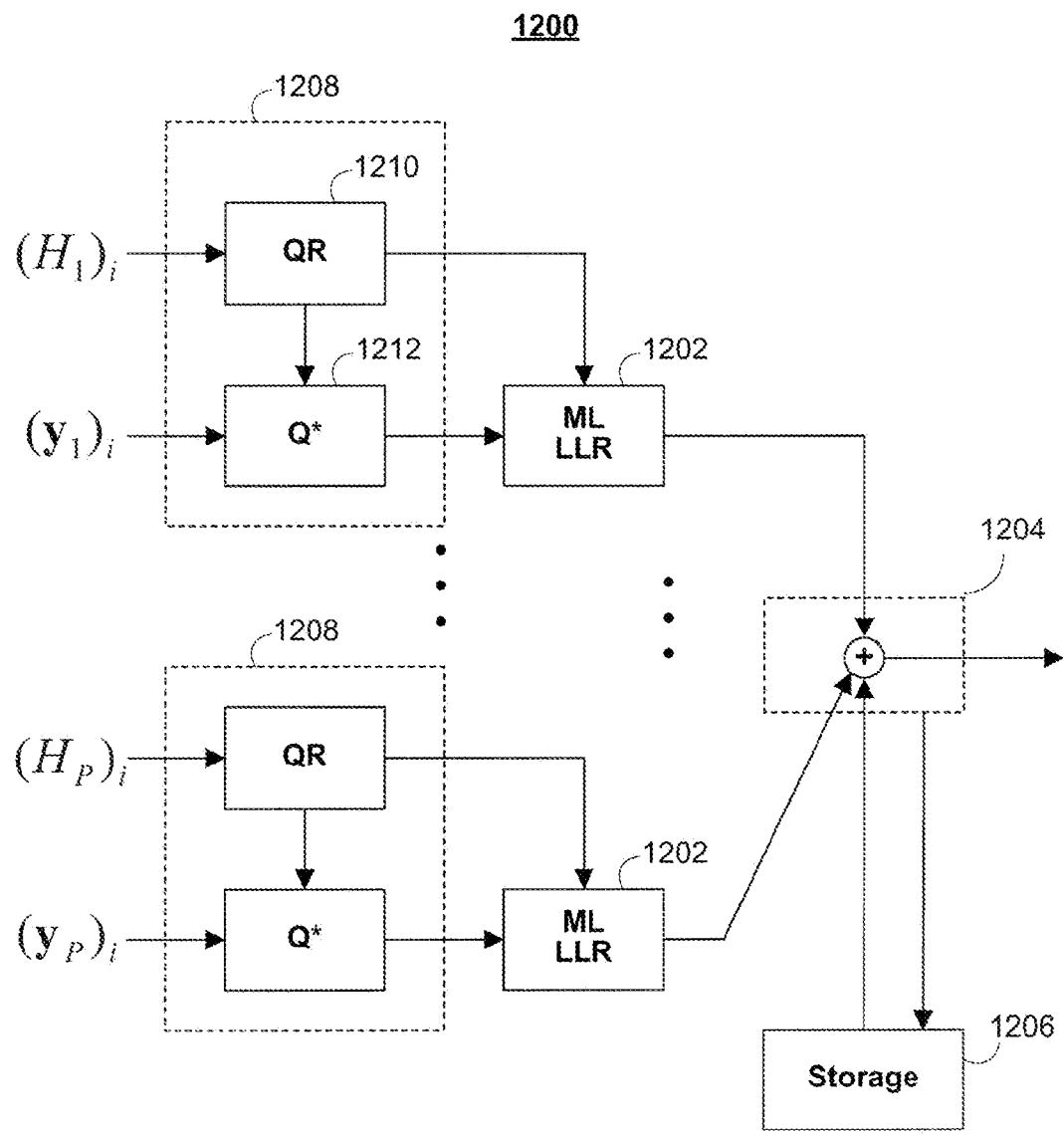
FIG. 12 is one embodiment of FIG. 11, where the receiver performs QR decomposition of the channel matrices and maximum-likelihood decoding.

Block diagram 1200 of FIG. 12 shows one embodiment of block diagram 1100 of FIG. 11. Signal processor block 1208 may contain channel preprocessing block 1210 and processing block 1212. Channel preprocessing block 1210 may perform QR decomposition on a channel response matrix. QR decomposition involves factoring the channel matrix into a matrix with orthonormal columns, Q, and a square, upper-triangular matrix R. Processing block 1212 utilizes the output of preprocessing block 1210 in order to process the received signal vector. In particular, processor block 1212 uses the transpose of orthonormal matrix Q, Q*, and processes the received signal vector by multiplying it by Q*. The result is $$Q^*y = Q^*QRx + Q^*n \tag{24}$$

$$= Rx + Q^*n. \tag{25}$$

Q*y, the processed signal, is then decoded by ML decoder 1202. ML decoder 1202 may compute the LLR for Q*y using an equation similar to that of equation (20). Thus, rather than computing a decoding metric given by $\|y-Hx\|^2$, ML decoder 1202 may compute $\|Q^*y - Rx\|^2$. Since R is an upper-triangular matrix, Rx is computationally less expensive than HX. Because ML decoder 1202 may need to compute $\|Q^*y-Rx\|^2$ repeatedly to calculate an LLR, the savings gained from QR decomposition may be considerable. Following decoding, the LLRs are summed by adder 1204 and stored in storage 1206. The result of adder 1204 is an estimate of the transmit signal. Storage 1206 can be utilized in substantially the same manner as storage 1106 in FIG. 11.

Figure 13:
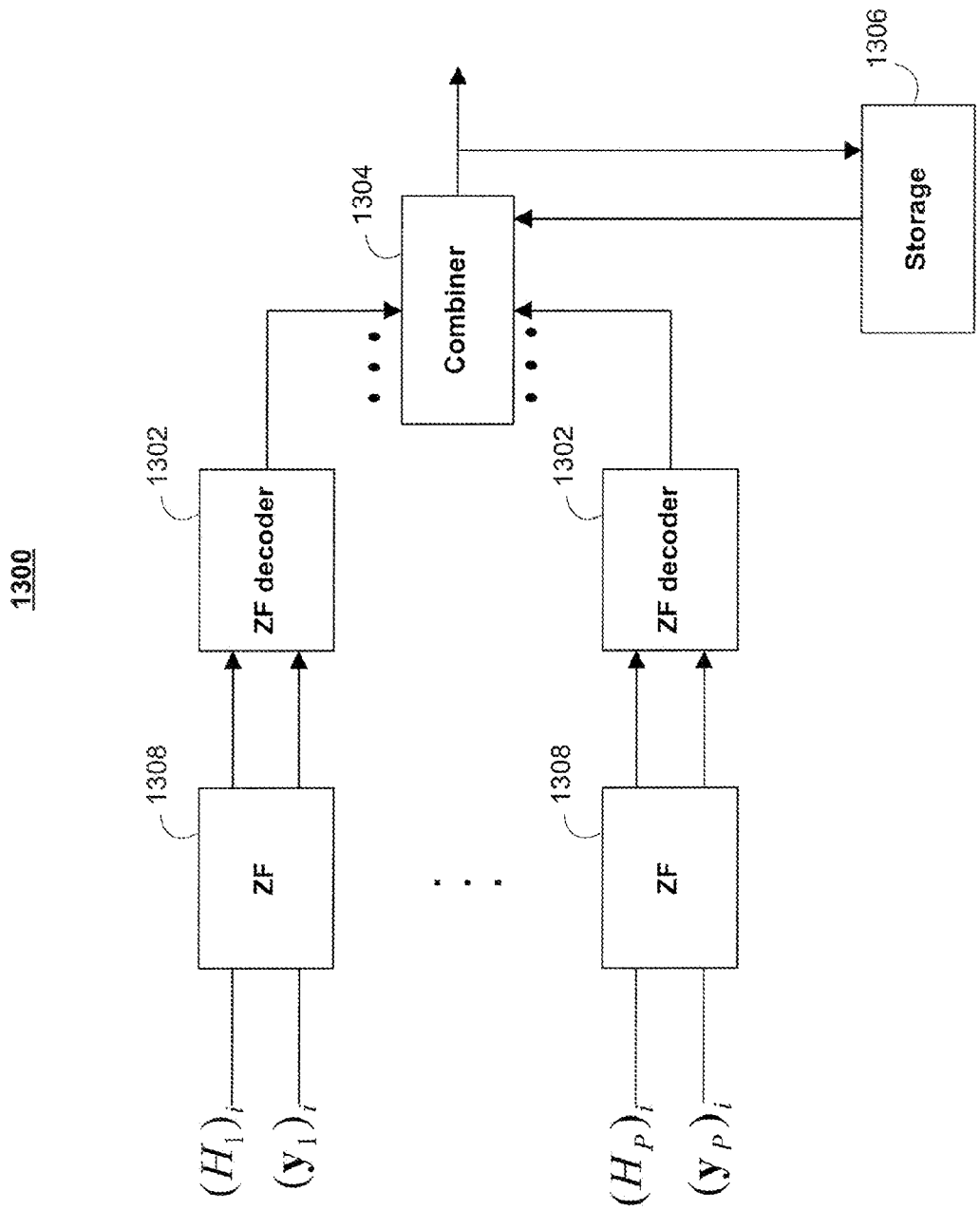
FIG. 13 is one embodiment of FIG. 12, where the receiver performs zero-forcing equalization and decoding.

Referring now to FIG. 13, block diagram 1300 is another embodiment of block diagram 1100 in accordance with one embodiment of the present invention. Signal processors 1308 perform zero-forcing equalization on each of the received signal vectors. Zero-forcing is a technique used to ideally eliminate the effect of a channel, H, from a received vector, y, by multiplying the received vector by the channel inverse, $H^{-1}$. Signal processors 1308, therefore, each includes a method to calculate the inverse, $H^{-1}$, or pseudo-inverse, $H^+ = (H^*H)^{-1}H^*$ of the channel matrix corresponding to the received signal vector. Processors 1308 then processes each signal vector by multiplying the signal vector with $H^+$. This produces $$\tilde{y}_i = H_i^+ y_i = H_i^+ H_i x + H_i^+ n_i \quad i = 1, \ldots, N(\lambda) \tag{26}$$

$$= x + \tilde{n}_i, \tag{27}$$

where $\tilde{n} = H^+ t$. Thus, the resulting signal vector is similar to the transmitted signal, but with additive correlated and amplified noise, $\tilde{n}_i$. The covariance of noise $\tilde{n}_i$ may be equal to $E[\tilde{n}_i \tilde{n}_i] = H_i^+ H_i^{+*}$. Each processed signal vector may then be decoded by one of ZF decoders 1302.

One valuable aspect of zero-forcing decoders 1302 in receiver 1300 comes from the fact that each component of $\tilde{y}_i$ may be decoded separately. For an ML decoding scheme, such as receiver 1200 of FIG. 12, the decoder has to consider the transmitted vector as a whole in order to calculate $\|y-Hx\|^2$. With zero-forcing, each component in $\tilde{y}_i$ may be decoded without regard to other components in $\tilde{y}_i$. To estimate the $k^{th}$ component of x, each of decoders 1302 may implement a method to calculate the metric, $$\sum_{k=1}^{N_t} \frac{|[H_i^+ y_i]_k - [x]_k|^2}{[H_i^+ H_i^{+*}]_{k,k}}, \tag{28}$$

for component, k, of $x_i$, or $[x_i]_k$. Thus, the subscript k indexes the kth element of a vector, and the subscript k,k indexes the $(k,k)^{th}$ element of a matrix.

The soft information produced by each of decoders 1302 may be combined by combiner 1304 using any suitable combining technique (e.g., unweighted addition, weighted addition, etc.). The result of combiner 1304 is an estimate of the transmitted sequence. If each of decoders 1302 calculates an LLR for each bit $b_\lambda$ in the transmitted bit sequence, the final LLR-like value for bit $b_\lambda$ produced at the output of receiver 1300 may be given as follows:

$$LLR_{ZF} = \sum_{i=1}^{N(\lambda)} L(b_\lambda | \tilde{y}_i, H_i^{-1} H_i^{-*}) \tag{29}$$

$$= \sum_{i=1}^{N(\lambda)} \ln \frac{Pr\{b_\lambda = 1 | \tilde{y}_i, H_i^{-1} H_i^{-*}\}}{Pr\{b_\lambda = 0 | \tilde{y}_i, H_i^{-1} H_i^{-*}\}} \tag{30}$$

$$\sim \sum_{i=1}^{N(\lambda)} \ln \frac{\sum_{[\hat{x}_i]_k^{(1)} \in x_\lambda^{(1)}} Pr\{[\tilde{y}_i]_k | [\hat{x}_i]_k^{(1)}, [H_i^{-1} H_i^{-*}]_{k,k}\}}{\sum_{[\hat{x}_i]_k^{(0)} \in x_\lambda^{(0)}} Pr\{[\tilde{y}_i]_k | [\hat{x}_i]_k^{(0)}, [H_i^{-1} H_i^{-*}]_{k,k}\}} \tag{31}$$

$$\sim \sum_{i=1}^{N(\lambda)} \ln \frac{\max_{[\hat{x}_i]_k^{(1)} \in x_\lambda^{(1)}} Pr\{[\tilde{y}_i]_k | [\hat{x}_i]_k^{(1)}, [H_i^{-1} H_i^{-*}]_{k,k}\}}{\max_{[\hat{x}_i]_k^{(0)} \in x_\lambda^{(0)}} Pr\{[\tilde{y}_i]_k | [\hat{x}_i]_k^{(0)}, [H_i^{-1} H_i^{-*}]_{k,k}\}} \tag{32}$$

$$= \sum_{i=1}^{N(\lambda)} \frac{1}{[H_i^+ H_i^{+*}]_{k,k}} \left\{ \min_{[\hat{x}_i]_k^{(0)} \in x_\lambda^{(0)}} |[\tilde{y}_i]_k - [\hat{x}_i]_k^{(0)}|^2 - \min_{[\hat{x}_i]_k^{(1)} \in x_\lambda^{(1)}} |[\tilde{y}_i]_k - [\hat{x}_i]_k^{(1)}|^2 \right\}. \tag{33}$$

Equations (29) and (30) follow from the definition of the LLR, where combiner 1304 performs unweighted addition on the decoded bits. In order to prevent complex calculations, the approximation, $\Sigma_i \log a_i = \log \max_i a_i$, may again be applied. Note that the final LLR of equation (33) is calculated using the decoding metric given by equation (28). The final soft information (e.g., the LLRs) computed by receiver 1300 may be stored in storage 1306. Storage 1306 may be utilized in substantially the same manner as storage 1106 in FIG. 11.

In some embodiments, QR decomposition as described above in connection with FIG. 12 may be used to simplify a ZF decoder, such as the ZF decoder in FIG. 13. Thus, in another embodiment of block diagram 1300, signal processor 1308 may include a channel preprocessor to perform QR decomposition on the corresponding channel response matrix. Following QR decomposition, the channel preprocessor or signal processor 1308 may calculate the inverse of QR, which is $R^{-1}Q^*$. Signal processors 1308 may then equalize the received signal vector by multiplying a received signal vector by $R^{-1}Q^*$, which produces $$\tilde{y}_i = R_i^{-1} Q_i^* y_i = R^{-1} Q_i^* Q_i R_i x + R^{-1} Q_i^* n \quad (34)$$

$$= x + \tilde{n}_i, \quad (35)$$

where $\tilde{n}_i = R_i^{-1} Q_i^* n$. Accordingly, the metric implemented by decoders 1302 becomes $$\sum_{k=1}^{N_t} \frac{|[R^{-1}Q^*y]_k - [x]_k|^2}{[R^{-1}R^{-*}]_{k,k}} \quad (36)$$

The subscript k indexes the kth element of a vector, and the subscript k,k indexes the $(k,k)^{th}$ element of a matrix.

Referring back to FIG. 11, in still other embodiments of block diagram 1100, signal processors 1108 may be minimum mean squared error (MMSE) equalizers. MMSE equalizers, like ZF equalizers, attempt to recover the transmitted signal from the received signal. Signal processors 1108 may process the received signal vectors by multiplying the receive signal vectors by $p(pH_t + N_0I)^{-1}$. Decoders 1102 may be simplified to linear decoders, and may therefore have lower complexity than higher performance decoders, such as ML decoders. Combiner 1104 may combine the decoded processed signal vectors, as described above. Therefore, any suitable type of linear equalizers, including ZF and MMSE equalizers, may be used in the present invention. These decoders may be used, for example, to enable decoders 1102 to implement low complexity, linear computational circuitry.

Figure 14A:
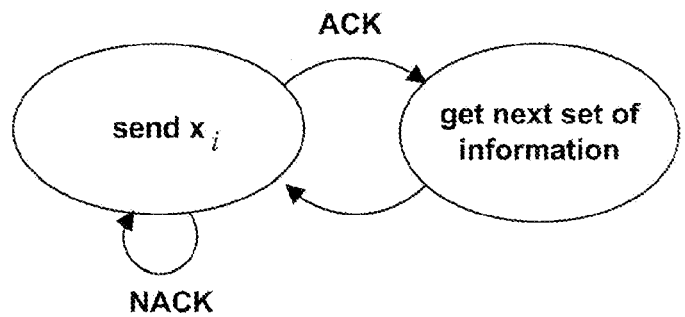
FIG. 14A is a flow diagram of a stop-and-wait HARQ transmitter.
Figure 14B:
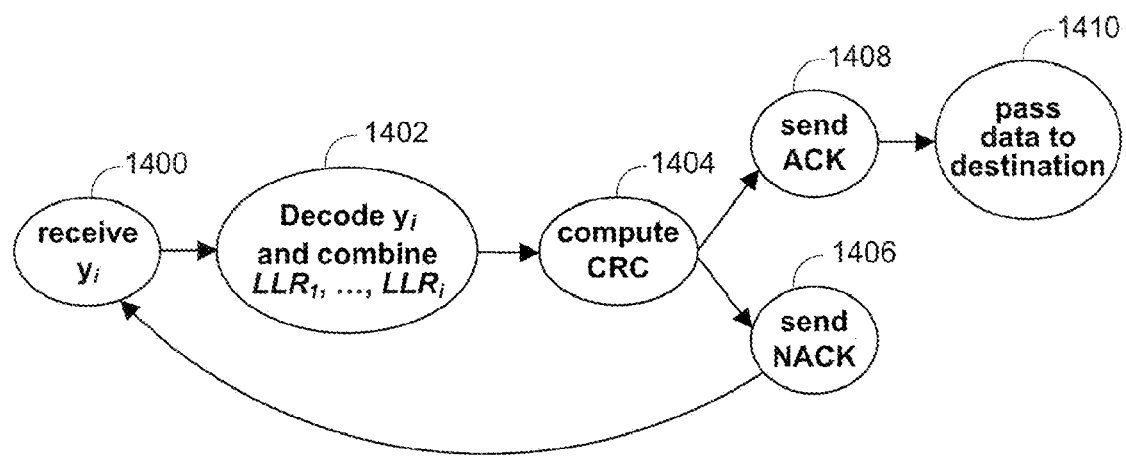
FIG. 14B is a flow diagram of a HARQ receiver.

A transmitter (e.g., transmitter 102 in FIG. 1) and receiver (e.g., receiver 112 in FIG. 1) in the present invention may utilize any suitable protocol in order for the receiver to receive multiple copies of common information. In one embodiment of the invention, the receiver receives multiple signal vectors using a retransmission protocol. For example, the transmitter and receiver may use an ARQ or HARQ protocol. In some embodiments of ARQ or HARQ, one signal vector is transmitted at a time. Therefore, P=1 and transmitter 102 sends a signal vector at N/P=N distinct times. The flow chart of the steps taken by transmitter 102 and receiver 112 are shown in FIG. 14A and FIG. 14B, respectively. FIG. 14A shows a transmitter following a stop-and-wait protocol, where the transmitter waits until a signal vector has been accepted by the receiver before sending the next signal vector. If $x_i$ is the same on each transmission, the protocol is HARQ type-I. Otherwise, it may be HARQ type-II or type-III. For HARQ type-II or type-III, the value of $x_i$ may depend on a particular error control scheme. In some embodiments, and as described below in connection with FIG. 14B, the value of a $x_i$ may additionally depend on information transmitted with a NACK received from the receiver. It should be understood that other ARQ/HARQ protocols, such as go-back-N or selective repeat may be used in place of stop-and-wait, and FIG. 14A may be modified in order to implement a different protocol.

FIG. 14B shows a simplified flow chart of the receiver protocol for a HARQ receiver that may be used in some embodiments of the present invention. At some time, receiver 112 receives $y_i$ at step 1400, corresponding to an $i^{th}$ transmission of common information. At step 1402, receiver 112 decodes $y_1$, and generates soft-information corresponding to a decision for x (e.g., using decoders 902, 1102, 1202, or 1302 in FIGS. 9 and 11-13, etc.). Following decoding, the soft-information for $y_i$ is combined with the soft-information from decoding $y_1, \ldots, y_{i-1}$ (e.g., using combiners 904, 1104, 1204, or 1304, etc.). Decoding errors may be corrected if, by combining multiple decoded vectors, enough correctly decoded signal vectors, or parts of signal vectors, are able to compensate for the incorrectly decoded bits in other decoded signal vectors. Following combining, the receiver may directly map the soft-information into a hard decision of x. Then, error detection is performed at step 1404, which in this case involves checking the CRC of the resulting bit stream. If errors are detected, the receiver may send a negative acknowledgement (NACK) message to the transmitter at 1406. Upon receipt of the NACK, the transmitter retransmits a signal vector, which is received at 1400 as $y_{i+1}$. $y_{i+1}$ is decoded and combined with previous information, as described previously. This procedure occurs N times, until by decoding and combining N received vectors, no CRC error is detected. At this point, the receiver sends an acknowledgment (ACK) message at step 1408 back to the transmitter to inform the transmitter that the vector has been successfully received. Also, since there are no errors detected in the data, the receiver passes the data to the destination at step 1410.

In some embodiments of the HARQ type-II or type-III transmission steps of FIG. 14B, the NACK sent at step 1406 may include information other than merely a retransmission request. The NACK may additionally include information on the type and amount of information to be retransmitted. For example, a receiver may not accept a signal vector until a predetermined reliability (e.g., a predetermined LLR magnitude) is obtained for each bit. If, after decoding and combining at step 1404, a subset of the LLRs is below the predetermined threshold, the NACK sent at step 1406 may include information on which bits are below the reliability threshold. In turn, the transmitter may puncture the original bit sequence to retransmit only those requested bits. Using this select retransmission mode, only necessary information is retransmitted. Therefore, the throughput of information in the transmission scheme may be greatly improved.

In another embodiment of the invention, the transmitter may send a signal vector, x, a predetermined number of times, irrespective of the presence of errors. For example, the receiver may obtain N transmissions of x from repetition coding. In this case, P=N and transmitter 102 sends signal vectors in one (N/P=1) batch. In other words, N copies of x are transmitted simultaneously, or within some interval of time. The receiver decodes $y_1, \ldots, y_N$, and combines the resulting soft-information. Repetition coding may be useful when there is no feasible backchannel for the receiver to send retransmission requests.

HARQ and repetition coding are two protocols that may be used in different embodiments of the present invention. Alternatively, repetition coding and HARQ may be combined such that multiple vectors are received at 1400 (FIG. 14B) and combined/decoded at 1402 prior to error-detection at 1406. That is, N>P>1. The invention, however, is not limited to the protocols and their combinations mentioned here. Currently, the IEEE 802.16e standard uses HARQ and repetition coding, so these particular protocols merely illustrate embodiments of the invention. Any protocol that allows the receiver to receive multiple copies of the same transmitted vector fall within the scope of the present invention.

Referring now to FIGS. 15A-15G, various exemplary implementations of the present invention are shown.

Figure 15A:
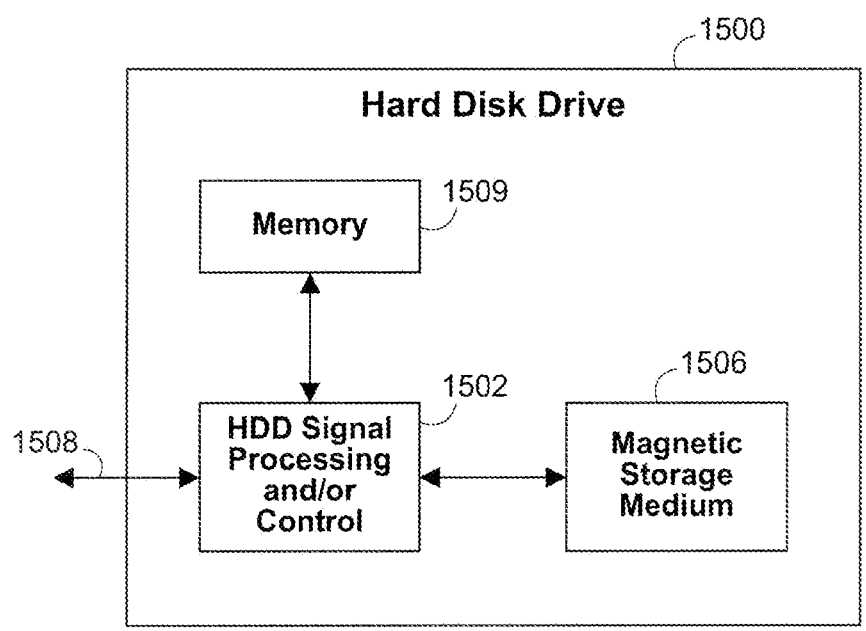
FIG. 15A is a block diagram of an exemplary hard disk drive that can employ the disclosed technology.

Referring now to FIG. 15A, the present invention can be implemented in a hard disk drive 1500. The present invention may implement either or both signal processing and/or control circuits, which are generally identified in FIG. 15A at 1502. In some implementations, the signal processing and/or control circuit 1502 and/or other circuits (not shown) in the HDD 1500 may process data, perform coding and/or encryption, perform calculations, and/or format data that is output to and/or received from a magnetic storage medium 1506.

The HDD 1500 may communicate with a host device (not shown) such as a computer, mobile computing devices such as personal digital assistants, cellular phones, media or MP3 players and the like, and/or other devices via one or more wired or wireless communication links 1508. The HDD 1500 may be connected to memory 1509 such as random access memory (RAM), low latency nonvolatile memory such as flash memory, read only memory (ROM) and/or other suitable electronic data storage.

Figure 15B:
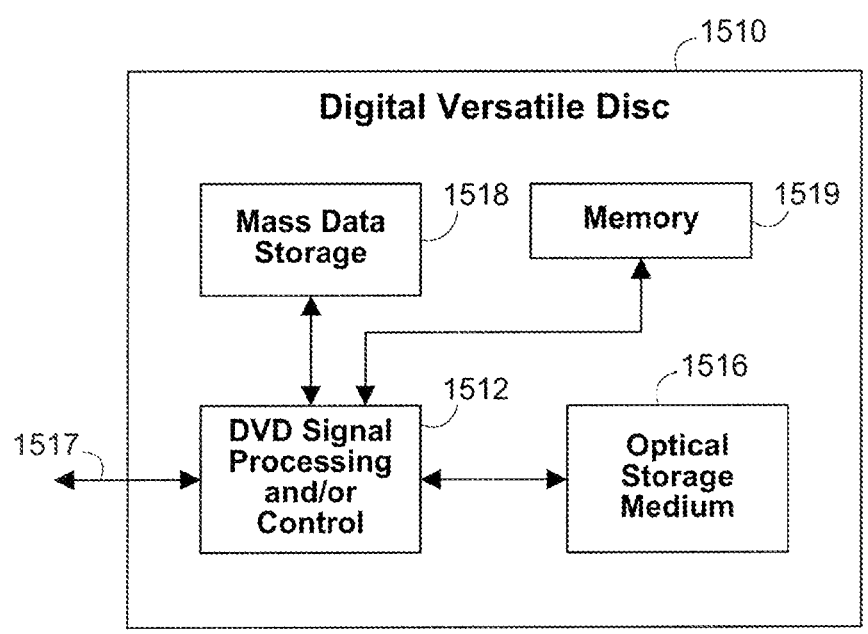
FIG. 15B is a block diagram of an exemplary digital versatile disc that can employ the disclosed technology.

Referring now to FIG. 15B, the present invention can be implemented in a digital versatile disc (DVD) drive 1510. The present invention may implement either or both signal processing and/or control circuits, which are generally identified in FIG. 15B at 1512, and/or mass data storage of the DVD drive 1510. The signal processing and/or control circuit 1512 and/or other circuits (not shown) in the DVD 1510 may process data, perform coding and/or encryption, perform calculations, and/or format data that is read from and/or data written to an optical storage medium 1516. In some implementations, the signal processing and/or control circuit 1512 and/or other circuits (not shown) in the DVD 1510 can also perform other functions such as encoding and/or decoding and/or any other signal processing functions associated with a DVD drive.

The DVD drive 1510 may communicate with an output device (not shown) such as a computer, television or other device via one or more wired or wireless communication links 1517. The DVD 1510 may communicate with mass data storage 1518 that stores data in a nonvolatile manner. The mass data storage 1518 may include a hard disk drive (HDD). The HDD may have the configuration shown in FIG. 15A. The HDD may be a mini HDD that includes one or more platters having a diameter that is smaller than approximately 1.8". The DVD 1510 may be connected to memory 1519 such as RAM, ROM, low latency nonvolatile memory such as flash memory and/or other suitable electronic data storage.

Figure 15C:
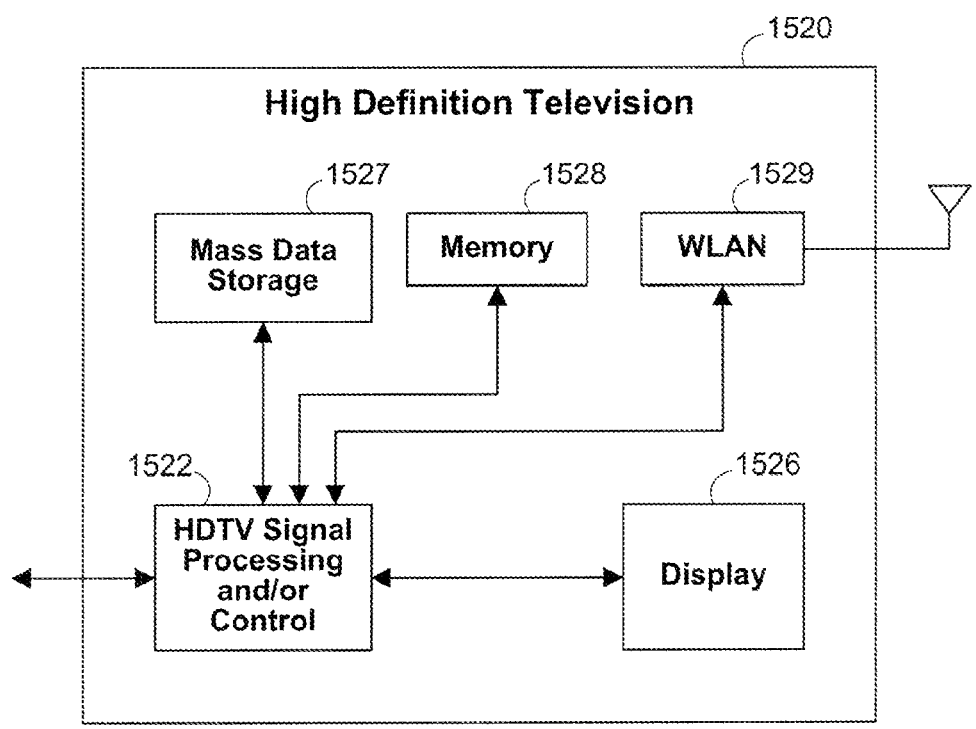
FIG. 15C is a block diagram of an exemplary high definition television that can employ the disclosed technology.

Referring now to FIG. 15C, the present invention can be implemented in a high definition television (HDTV) 1520. The present invention may implement either or both signal processing and/or control circuits, which are generally identified in FIG. 15C at 1522, a WLAN interface and/or mass data storage of the HDTV 1520. The HDTV 1520 receives HDTV input signals in either a wired or wireless format and generates HDTV output signals for a display 1526. In some implementations, signal processing circuit and/or control circuit 1522 and/or other circuits (not shown) of the HDTV 1520 may process data, perform coding and/or encryption, perform calculations, format data and/or perform any other type of HDTV processing that may be required.

The HDTV 1520 may communicate with mass data storage 1527 that stores data in a nonvolatile manner such as optical and/or magnetic storage devices for example hard disk drives HDD and/or DVDs. At least one HDD may have the configuration shown in FIG. 15A and/or at least one DVD may have the configuration shown in FIG. 15B. The HDD may be a mini HDD that includes one or more platters having a diameter that is smaller than approximately 1.8". The HDTV 1520 may be connected to memory 1528 such as RAM, ROM, low latency nonvolatile memory such as flash memory and/or other suitable electronic data storage. The HDTV 1520 also may support connections with a WLAN via a WLAN network interface 1529.

Figure 15D:
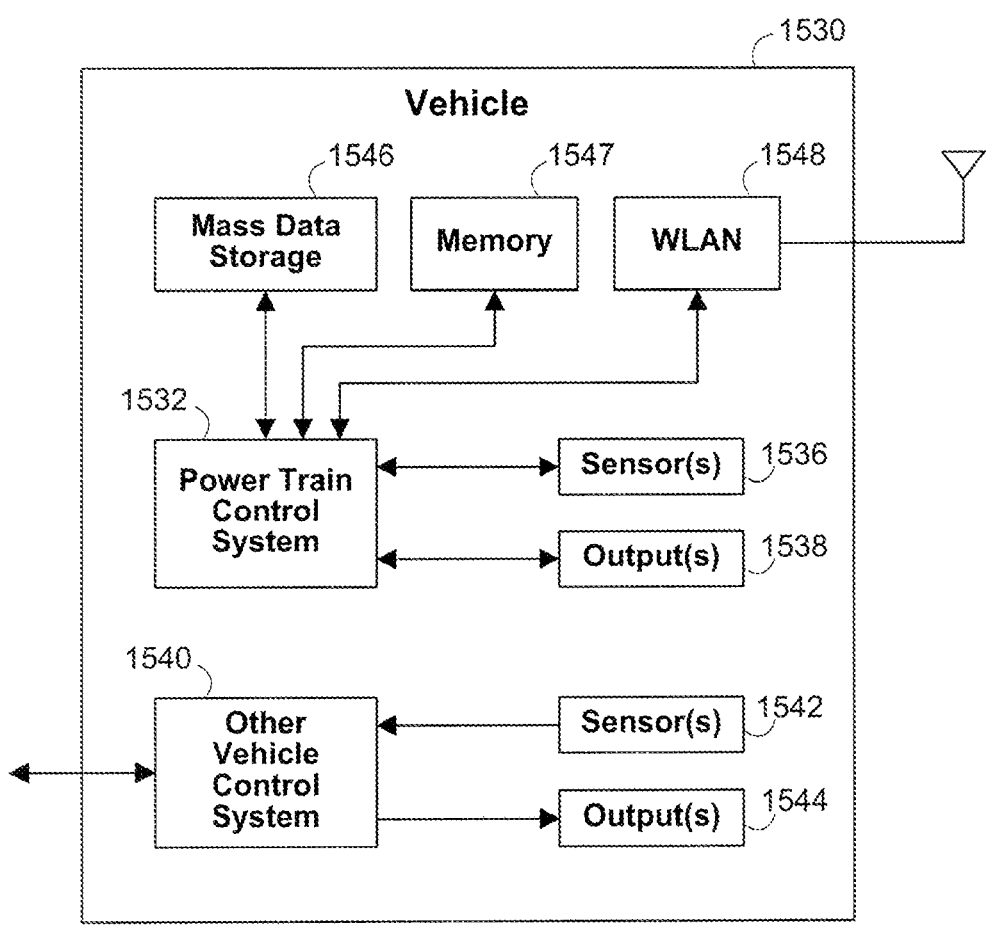
FIG. 15D is a block diagram of an exemplary vehicle that can employ the disclosed technology.

Referring now to FIG. 15D, the present invention implements a control system of a vehicle 1530, a WLAN interface and/or mass data storage of the vehicle control system. In some implementations, the present invention may implement a powertrain control system 1632 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1640 of the vehicle 1630. The control system 1640 may likewise receive signals from input sensors 1642 and/or output control signals to one or more output devices 1644. In some implementations, the control system 1640 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1632 may communicate with mass data storage 1646 that stores data in a nonvolatile manner. The mass data storage 1046 may include optical and/or magnetic storage devices for example hard disk drives HDD and/or DVDs. At least one HDD may have the configuration shown in FIG. 15A and/or at least one DVD may have the configuration shown in FIG. 15B. The HDD may be a mini HDD that includes one or more platters having a diameter that is smaller than approximately 1.8". The powertrain control system 1532 may be connected to memory 1547 such as RAM, ROM, low latency nonvolatile memory such as flash memory and/or other suitable electronic data storage. The powertrain control system 1532 also may support connections with a WLAN via a WLAN network interface 1548. The control system 1540 may also include mass data storage, memory and/or a WLAN interface (all not shown).

Figure 15E:
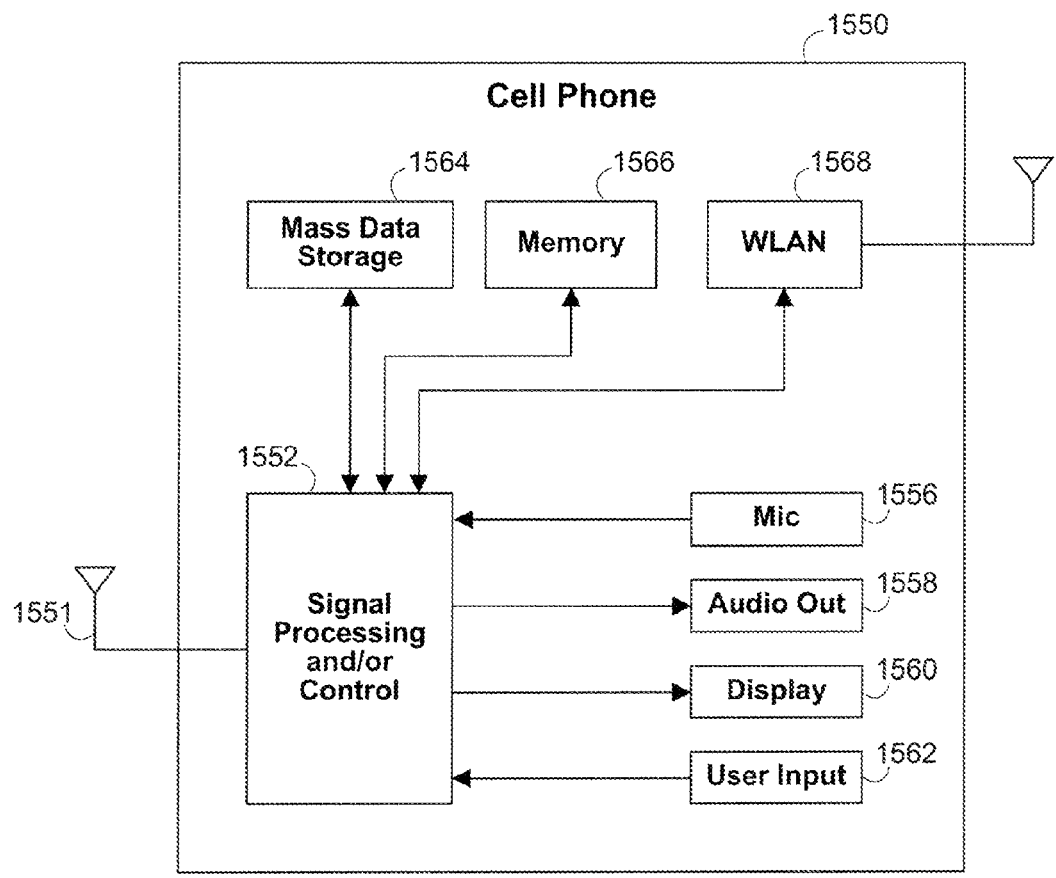
FIG. 15E is a block diagram of an exemplary cell phone that can employ the disclosed technology.

Referring now to FIG. 15E, the present invention can be implemented in a cellular phone 1550 that may include a cellular antenna 1551. The present invention may implement either or both signal processing and/or control circuits, which are generally identified in FIG. 15E at 1552, a WLAN interface and/or mass data storage of the cellular phone 1550. In some implementations, the cellular phone 1550 includes a microphone 1556, an audio output 1558 such as a speaker and/or audio output jack, a display 1560 and/or an input device 1562 such as a keypad, pointing device, voice actuation and/or other input device. The signal processing and/or control circuits 1552 and/or other circuits (not shown) in the cellular phone 1550 may process data, perform coding and/or encryption, perform calculations, format data and/or perform other cellular phone functions.

The cellular phone 1550 may communicate with mass data storage 1564 that stores data in a nonvolatile manner such as optical and/or magnetic storage devices for example hard disk drives HDD and/or DVDs. At least one HDD may have the configuration shown in FIG. 15A and/or at least one DVD may have the configuration shown in FIG. 15B. The HDD may be a mini HDD that includes one or more platters having a diameter that is smaller than approximately 1.8". The cellular phone 1550 may be connected to memory 1566 such as RAM, ROM, low latency nonvolatile memory such as flash memory and/or other suitable electronic data storage. The cellular phone 1550 also may support connections with a WLAN via a WLAN network interface 1568.

Figure 15F:
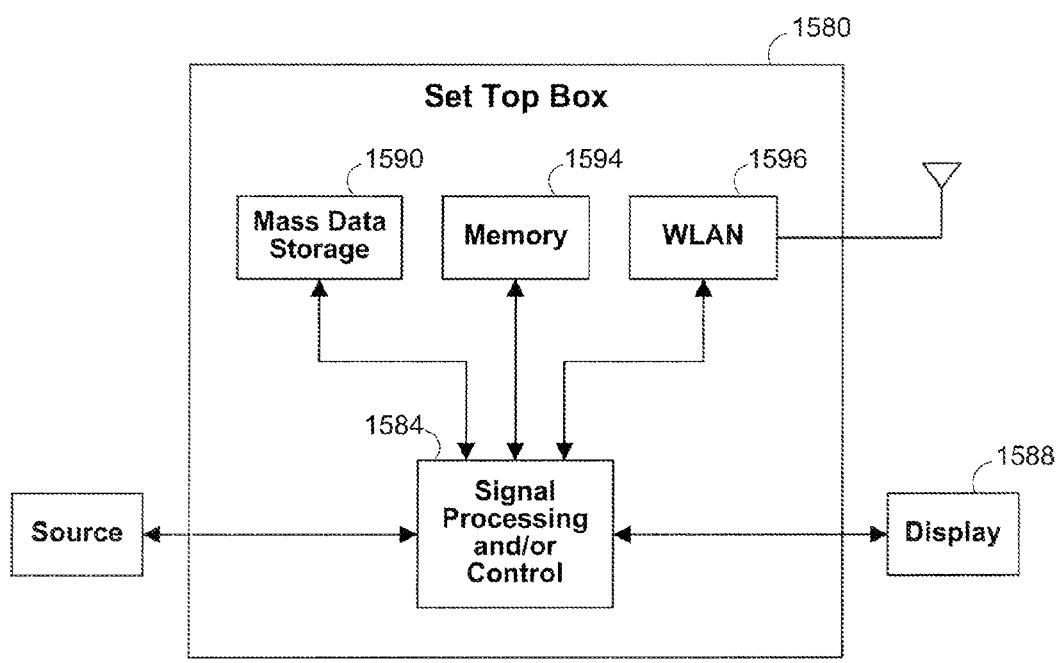
FIG. 15F is a block diagram of an exemplary set top box that can employ the disclosed technology.

Referring now to FIG. 15F, the present invention can be implemented in a set top box 1580. The present invention may implement either or both signal processing and/or control circuits, which are generally identified in FIG. 15F at 1584, a WLAN interface and/or mass data storage of the set top box 1580. The set top box 1580 receives signals from a source such as a broadband source and outputs standard and/or high definition audio/video signals suitable for a display 1588 such as a television and/or monitor and/or other video and/or audio output devices. The signal processing and/or control circuits 1584 and/or other circuits (not shown) of the set top box 1580 may process data, perform coding and/or encryption, perform calculations, format data and/or perform any other set top box function.

The set top box 1580 may communicate with mass data storage 1590 that stores data in a nonvolatile manner. The mass data storage 1590 may include optical and/or magnetic storage devices for example hard disk drives HDD and/or DVDs. At least one HDD may have the configuration shown in FIG. 15A and/or at least one DVD may have the configuration shown in FIG. 15B. The HDD may be a mini HDD that includes one or more platters having a diameter that is smaller than approximately 1.8". The set top box 1580 may be connected to memory 1594 such as RAM, ROM, low latency nonvolatile memory such as flash memory and/or other suitable electronic data storage. The set top box 1580 also may support connections with a WLAN via a WLAN network interface 1596.

Figure 15G:
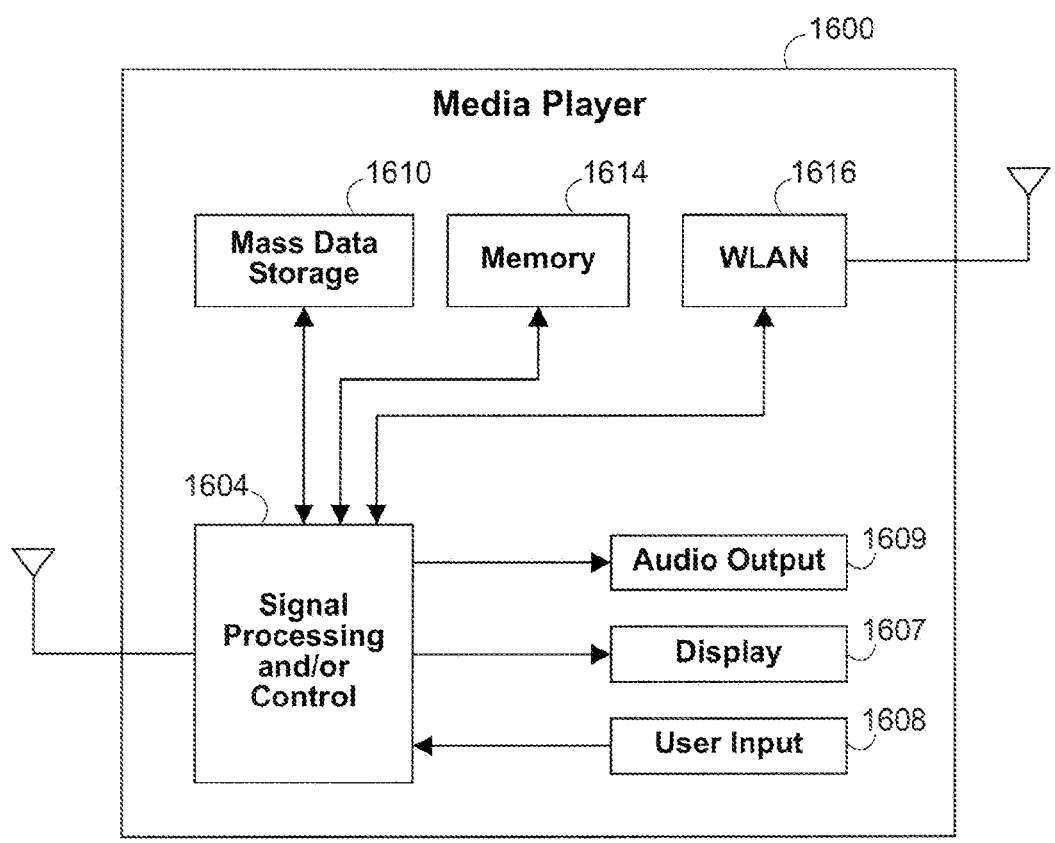
FIG. 15G is a block diagram of an exemplary media player that can employ the disclosed technology.

Referring now to FIG. 15G, the present invention can be implemented in a media player 1660. The present invention may implement either or both signal processing and/or control circuits, which are generally identified in FIG. 15G at 1604, a WLAN interface and/or mass data storage of the media player 1600. In some implementations, the media player 1600 includes a display 1607 and/or a user input 1608 such as a keypad, touchpad and the like. In some implementations, the media player 1600 may employ a graphical user interface (GUI) that typically employs menus, drop down menus, icons and/or a point-and-click interface via the display 1607 and/or user input 1608. The media player 1600 further includes an audio output 1609 such as a speaker and/or audio output jack. The signal processing and/or control circuits 1604 and/or other circuits (not shown) of the media player 1600 may process data, perform coding and/or encryption, perform calculations, format data and/or perform any other media player function.

The media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 15A and/or at least one DVD may have the configuration shown in FIG. 15B. The HDD may be a mini HDD that includes one or more platters having a diameter that is smaller than approximately 1.8". The media player 1600 may be connected to memory 1614 such as RAM, ROM, low latency nonvolatile memory such as flash memory and/or other suitable electronic data storage. The media player 1600 also may support connections with a WLAN via a WLAN network interface 1616. Still other implementations in addition to those described above are contemplated.

The foregoing describes systems and methods for decoding a signal vector, where the receiver may obtain receive multiple instances of the same transmit signal vector. The above described embodiments of the present invention are presented for the purposes of illustration and not of limitation. Furthermore, the present invention is not limited to a particular implementation. The invention may be implemented in hardware, such as on an application specific integrated circuit (ASIC) or on a field-programmable gate array (FPGA). The invention may also be implement in software.

What is claimed is:

1. A method for decoding a signal vector in a multiple-input multiple-output transmission scheme, comprising:
   receiving multiple signal vectors corresponding to a common digital information sequence, wherein the multiple signal vectors are received within distinct time intervals;
   decoding the received signal vectors, wherein decoding a given received signal vector comprises computing soft information for each of the bits in the given received signal vector based on channel information, associated with the given received signal vector;
   combining the soft information from each decoded signal vector to obtain an estimate of the digital information sequence;
   requesting retransmission of a subset of information associated with signal vectors received in a first time interval, wherein the subset of information is selected based on a per-bit reliability metric of the digital information sequence for signal vectors received in the first time interval;
   storing an estimate of the digital information sequence corresponding to signal vectors received in the first time interval; and
   combining an estimate of the digital information sequence corresponding to signal vectors received in a second time interval with the stored estimate corresponding to the signal vectors received in the first time interval.

2. The method of claim 1 wherein the signal vectors are received using a retransmission protocol.

3. The method of claim 2, wherein the retransmission protocol is a hybrid automatic repeat request (HARQ) protocol.

4. The method of claim 2 wherein the retransmission protocol uses incremental redundancy.

5. The method of claim 1, further comprising receiving a predetermined number of signal vectors.

6. The method of claim 5, wherein the predetermined number of signal vectors are received using repetition coding.

7. The method of claim 1, wherein symbols of the received signal vectors correspond to a signal constellation set.

8. The method of claim 6, wherein the signal constellation set is based on quadrature amplitude modulation.

9. The method of claim 1, wherein the received signal vectors are one of coded and uncoded data.

10. The method of claim 1, wherein decoding the received signal vectors comprises performing maximum-likelihood decoding.

11. The method of claim 10, wherein performing maximum-likelihood decoding comprises calculating the metric, $$\|y-Hx\|^2$$

where y is a received signal vector, x is the common transmit vector, and H is a channel response matrix associated with y.

12. The method of claim 10, wherein computing soft information for bits of the digital information sequence comprises calculating a log-likelihood ratio for each bit.

13. The method of claim 12 wherein calculating a log-likelihood ratio for each bit comprises calculating, for each bit, $$LLR_{BLC-ML} = \sum_{i=1}^{N(\lambda)} \left\{ \min_{\hat{x}_i^{(0)} \in X_\lambda^{(0)}} \|y_i - H_i \hat{x}_i^{(0)}\|^2 - \min_{\hat{x}_i^{(1)} \in X_\lambda^{(1)}} \|y_i - H_i \hat{x}_i^{(1)}\|^2 \right\}.$$

14. The method of claim 12 wherein calculating a log-likelihood ratio for each bit comprises setting the log-likelihood ratio for a bit to zero if no information is available about that bit.

15. The method of claim 1, wherein combining the soft information comprises combining the soft information corresponding to signal vectors received in a same time interval to obtain an estimate of the digital information sequence corresponding to signal vectors received in the same time interval.

16. The method of claim 15, further comprising storing the estimate of the digital information sequence corresponding to signal vectors received in the first and the second time interval by overwriting the stored estimate corresponding to the signal vectors received in the first time interval.

17. The method of claim 1, further comprising:
preprocessing a channel response matrix associated with each of the received signal vectors; and
processing each of the received signal vectors based on its associated preprocessed channel response matrix.

18. The method of claim 17, wherein preprocessing a channel response matrix comprises performing QR decomposition on the channel response matrix.

19. The method of claim 17, wherein processing the received signal vectors comprises performing zero-forcing equalization.

20. The method of claim 19, wherein decoding comprises calculating the metric $$\sum_{k=1}^{N_t} \frac{|[H_i^+ y_i]_k - [x]_k|^2}{[H_i^+ H_i^{+*}]_{k,k}},$$

where H is a channel matrix corresponding to a received signal vector, k indexes the kth component of a vector, and k,k indexes the $(k,k)^{th}$ component of a matrix.

21. The method of claim 19, wherein decoding comprises calculating $$\sum_{i=1}^{N(\lambda)} \frac{1}{[H_i^+ H_i^{+*}]_{k,k}} \left\{ \min_{\hat{x}_i^{(0)} \in X_\lambda^{(0)}} |[\tilde{y}_i]_k - [\hat{x}_i]_k^{(0)}|^2 - \min_{\hat{x}_i^{(1)} \in X_\lambda^{(1)}} |[\tilde{y}_i]_k - [\hat{x}_i]_k^{(1)}|^2 \right\}.$$

22. The method of claim 17, wherein processing the received signal vectors comprises performing minimum mean squared error equalization.

23. The method of claim 18, wherein decoding comprises performing maximum-likelihood decoding.

24. The method of claim 23, wherein performing maximum-likelihood decoding comprises calculating the metric, $$\|Q^* y - Rx\|^2$$

where y is a received signal vector, x is the common transmit signal vector, Q and R are the resulting matrix from QR decomposition, and Q* is the transpose of Q.

25. A system for decoding a signal vector in a multiple-input multiple output transmission scheme, comprising a processor configured to:
receive signal vectors corresponding to a common digital information sequence, wherein the signal vectors are received within distinct time intervals;
decode the received signal vectors by computing soft information for each of the bits in a given received signal vector based on channel information associated with the given received signal vector;
combine the soft information from each decoded signal vector to obtain an estimate of the digital information sequence;
request retransmission of a subset of information associated with signal vectors received in a first time interval, wherein the subset of information is selected based on a per-bit reliability metric of the digital information sequence for signal vectors received in the first time interval;
store an estimate of the digital information sequence corresponding to signal vectors received in the first time interval; and
combine an estimate of the digital information sequence corresponding to signal vectors received in a second time interval with the stored estimate corresponding to the signal vectors received in the first time interval.

26. The system of claim 25 wherein the signal vectors are received using a retransmission protocol.

27. The system of claim 26, wherein the retransmission protocol is a hybrid automatic repeat request (HARQ) protocol.

28. The system of claim 26 wherein the retransmission protocol uses incremental redundancy.

29. The system of claim 25, wherein the processor is further configured to receive a predetermined number of signal vectors.

30. The system of claim 29, wherein the predetermined number of signal vectors are received using repetition coding.

31. The system of claim 25, wherein symbols of the received signal vectors correspond to a signal constellation set.

32. The system of claim 31, wherein the signal constellation set is based on quadrature amplitude modulation.

33. The system of claim 25, wherein the received signal vectors are one of coded and uncoded data.

34. The system of claim 25, wherein the processor is configured to decode the received signal vectors by performing maximum-likelihood decoding.

35. The system of claim 34, wherein the processor is configured to perform the maximum-likelihood decoding by calculating the metric, $$\|y - Hx\|^2$$

where y is a received signal vector, x is the common transmit vector, and H is a channel response matrix associated with y.

36. The system of claim 34, wherein the processor is configured to compute soft information for each of the bits in a given received signal vector by calculating a log-likelihood ratio for each of the bits in the given received signal vector.

37. The system of claim 36 wherein the processor is configured to calculate a log-likelihood ratio for each of the bits by calculating, for each of the bits, $$LLR_{BLC-ML} = \sum_{i=1}^{N(\lambda)} \left\{ \min_{\hat{x}_i^{(0)} \in X_\lambda^{(0)}} \|y_i - H_i \hat{x}_i^{(0)}\|^2 - \min_{\hat{x}_i^{(1)} \in X_\lambda^{(1)}} \|y_i - H_i \hat{x}_i^{(1)}\|^2 \right\}.$$

38. The system of claim 36 wherein the processor is configured to calculate a log-likelihood ratio for each of the bits by setting the log-likelihood ratio for a bit to zero if no information is available about that bit.

39. The system of claim 25, wherein the processor is configured to combine the soft information by combining the soft information corresponding to signal vectors received in a same time interval to obtain an estimate of the digital information sequence corresponding to signal vectors received in the same time interval.

40. The system of claim 39, wherein the processor is further configured to store the estimate of the digital information sequence corresponding to signal vectors received in the first and second time intervals by overwriting the stored estimate corresponding to the signal vectors received in the first time interval.

41. The system of claim 25, wherein the processor is further configured to:
preprocess a channel response matrix associated with each of the received signal vectors; and
process each of the received signal vectors based on its associated preprocessed channel response matrix.

42. The system of claim 41, wherein the processor is configured to preprocess a channel response matrix by performing a QR decomposition on channel response matrices associated with the received signal vectors.

43. The system of claim 41, wherein the processor is configured to process the receiving signal vectors by performing zero-forcing equalization.

44. The system of claim 43, wherein the processor is configured to decode the processed received signal vectors by calculating the metric $$\sum_{k=1}^{N_t} \frac{|[H_i^+ y_i]_k - [x]_k|^2}{[H_i^+ H_i^{+*}]_{k,k}}$$

where H is a channel matrix corresponding to a received signal vector, k indexes the kth component of a vector, and k,k indexes the $(k,k)^{th}$ component of a matrix.

45. The system of claim 43, wherein the processor is configured to decode the processed received signal vectors by calculating $$\sum_{i=1}^{N(\lambda)} \frac{1}{[H_i^+ H_i^{+*}]_{k,k}} \left\{ \min_{[\hat{x}_i]_k^{(0)} \in X_\lambda^{(0)}} |[\tilde{y}_i]_k - [\hat{x}_i]_k^{(0)}|^2 - \min_{[\hat{x}_i]_k^{(1)} \in X_\lambda^{(1)}} |[\tilde{y}_i]_k - [\hat{x}_i]_k^{(1)}|^2 \right\}.$$

46. The system of claim 41, wherein the processor is configured to process each of the received signal vectors by performing minimum mean squared error equalization.

47. The system of claim 42, wherein the processor is configured to decode by performing maximum-likelihood decoding.

48. The system of claim 47, wherein the processor is configured to perform maximum-likelihood decoding by calculating the metric, $$\|Q^* y - Rx\|^2$$

where y is a received signal vector, x is the common transmit signal vector, Q and R are the resulting matrix from QR decomposition, and Q* is the transpose of Q.

49. A system for decoding a signal vector in a multiple-input multiple-output transmission scheme, comprising:
a receiver for receiving multiple signal vectors corresponding to a common digital information sequence, wherein the multiple signal vectors are received within distinct time intervals;
one or more decoders for decoding the received signal vectors, wherein the one or more decoders compute soft information for each of the bits in a given received signal vector based on channel information associated with the given received signal vector;
combining circuitry for combining the soft information from each decoded signal vector to obtain an estimate of the digital information sequence;
control circuitry for requesting retransmission of a subset of information associated with signal vectors received in a first time interval, wherein the subset of information is selected based on a per-bit reliability metric of the digital information sequence for signal vectors received in the first time interval; and
a memory for storing an estimate of the digital information sequence corresponding to signal vectors received in the first time interval, wherein the combining circuitry further combines an estimate of the digital information sequence corresponding to signal vectors received in a second time interval with the stored estimate corresponding to the signal vectors received in the first time interval.

50. The system of claim 49 wherein the received signal vectors are received using a retransmission protocol.

51. The system of claim 50, wherein the retransmission protocol is a hybrid automatic repeat request (HARQ) protocol.

52. The system of claim 50 wherein the retransmission protocol uses incremental redundancy.

53. The system of claim 49, wherein a predetermined number of signal vectors are received.

54. The system of claim 53, wherein the predetermined number of signal vectors are received using repetition coding.

55. The system of claim 49, wherein symbols of the received signal vectors correspond to a signal constellation set.

56. The system of claim 55, wherein the signal constellation set is based on quadrature amplitude modulation.

57. The system of claim 49, wherein the received signal vectors are one of coded and uncoded data.

58. The system of claim 49, wherein the one or more decoders comprise maximum-likelihood decoders.

59. The system of claim 58, wherein the one or more decoders calculate the metric, $$\|y - Hx\|^2$$

where y is a received signal vector, x is the common transmit vector, and H is a channel response matrix associated with y.

60. The system of claim 58, wherein the one or more maximum-likelihood decoders calculate log-likelihood ratios for bits of the digital information sequence.

61. The system of claim 60 wherein the maximum-likelihood decoders calculate, for each bit, $$LLR_{BLCML} = \sum_{i=1}^{N(\lambda)} \left\{ \min_{\hat{x}_i^{(0)} \in X_\lambda^{(0)}} \|y_i - H_i \hat{x}_i^{(0)}\|^2 - \min_{\hat{x}_i^{(1)} \in X_\lambda^{(1)}} \|y_i - H_i \hat{x}_i^{(1)}\|^2 \right\}.$$

62. The system of claim 60 wherein the maximum-likelihood decoders set a log-likelihood ratio to zero if no information is available about a bit.

63. The system of claim 49, wherein the combining circuitry combines soft information corresponding to signal vectors received in a same time interval to obtain an estimate of the digital information sequence corresponding to signal vectors received in the same time interval.

64. The system of claim 62, wherein the estimate of the digital information sequence corresponding to signal vectors received in the first and the second time interval is stored in the memory by overwriting the stored estimate corresponding to the signal vectors received in the first time interval.

65. The system of claim 49, further comprising:
a channel preprocessor associated with each decoder for preprocessing a channel response matrix associated with each of the received signal vectors; and
processing circuitry associated with each decoder for processing each of the received signal vectors based on its associated preprocessed channel matrix.

66. The system of claim 65, wherein each channel preprocessor performs QR decomposition on a channel response matrix associated with a received signal vector.

67. The system of claim 65, wherein the processing circuitry associated with each decoder comprises a zero-forcing equalizer.

68. The system of claim 67, wherein the one or more decoders calculate the metric $$\sum_{k=1}^{N_t} \frac{|[H_i^+ y_i]_k - [x]_k|^2}{[H_i^+ H_i^{+*}]_{k,k}}$$

where H is a channel matrix corresponding to a received signal vector, k indexes the kth component of a vector, and k,k indexes the $(k,k)^{th}$ component of a matrix.

69. The system of claim 67, wherein the one or more decoders calculate $$\sum_{i=1}^{N(\lambda)} \frac{1}{[H_i^+ H_i^{+*}]_{k,k}} \left\{ \min_{[\hat{x}_i]_k^{(0)} \in X_\lambda^{(0)}} |[\tilde{y}_i]_k - [\hat{x}_i]_k^{(0)}|^2 - \min_{[\hat{x}_i]_k^{(1)} \in X_\lambda^{(1)}} |[\tilde{y}_i]_k - [\hat{x}_i]_k^{(1)}|^2 \right\}.$$

70. The system of claim 65, wherein the processing circuitry associated with each decoder comprises a minimum mean squared error equalizer.

71. The system of claim 66, wherein the one or more decoders are maximum-likelihood decoders.

72. The system of claim 71, wherein the one or more decoders calculate the metric, $$\|Q^* y - Rx\|^2$$

where y is the received signal vector, x is the common transmit signal vector, Q and R are the resulting matrix from QR decomposition, and Q* is the transpose of Q.

* * * * *